(12) United States Patent
Taima et al.

(10) Patent No.: US 6,747,610 B1
(45) Date of Patent: Jun. 8, 2004

(54) STEREOSCOPIC IMAGE DISPLAY APPARATUS CAPABLE OF SELECTIVELY DISPLAYING DESIRED STEREOSCOPIC IMAGE

(75) Inventors: Kenji Taima, Moriguchi (JP); Tetsuya Enomoto, Yawata (JP); Ryuhei Amano, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/116,456

(22) Filed: Jul. 16, 1998

(30) Foreign Application Priority Data

| Jul. 22, 1997 | (JP) | 9-195879 |
| Jul. 23, 1997 | (JP) | 9-196733 |
| Jul. 23, 1997 | (JP) | 9-197373 |
| Jul. 31, 1997 | (JP) | 9-206385 |

(51) Int. Cl.$^7$ .............................................. G09G 5/00
(52) U.S. Cl. ................................. 345/6; 345/9; 349/15; 359/458; 359/462; 348/51
(58) Field of Search .................... 345/6, 9; 358/88; 359/458, 462, 465; 349/15; 348/51

(56) References Cited

U.S. PATENT DOCUMENTS

| 4,962,422 A | * | 10/1990 | Ohtomo et al. ............... 358/88 |
| 5,528,420 A | * | 6/1996 | Momochi .................... 359/463 |
| 5,945,965 A | * | 8/1999 | Inoguchi et al. ............... 345/6 |

FOREIGN PATENT DOCUMENTS

| JP | 62-128369 | 6/1987 |
| JP | 63-70284 | 3/1988 |
| JP | 1-235140 | 9/1989 |
| JP | 3-123537 | 5/1991 |
| JP | 4-175979 | 6/1992 |
| JP | 5-314226 | 11/1993 |
| JP | 7-129792 | 5/1995 |
| JP | 7-230556 | 8/1995 |
| JP | 7-239951 | 9/1995 |
| JP | 8-19003 | 1/1996 |
| JP | 8-63615 | 3/1996 |
| JP | 8-123979 | 5/1996 |
| JP | 8-186844 | 7/1996 |
| JP | 8-201941 | 8/1996 |
| JP | 8-205201 | 8/1996 |
| JP | 8-205203 | 8/1996 |
| JP | 9-102052 | 4/1997 |
| JP | 9-167253 | 6/1997 |
| JP | 9-245195 | 9/1997 |
| JP | 410026741 A | * 1/1998 ........... G02B/27/22 |

OTHER PUBLICATIONS

"New Autostereoscopic (No–Glasses) LCD Image Splitter Displays," Ken Mashitani et al., 3D Image Conference '96, pp. 90–95.
"Construction of Intermediate Multi–viewpoint Images from a Set of Stereo Image Pair," Nobuhiro Tsunashima et al., 3D Image Conference '95, pp. 174–177.
"Disparity Estimation with Edge Information for Synthesizing Intermediate View Images," Takeo Azuma et al., 3D Image Conference '95, pp. 190–195.

* cited by examiner

*Primary Examiner*—Steven Saras
*Assistant Examiner*—Srilakshmi K Kumar
(74) *Attorney, Agent, or Firm*—Arent Fox Kintner Plotkin & Kahn

(57) ABSTRACT

A stereoscopic image display apparatus capable of presenting a stereoscopic image of a desired planer image includes an input operating unit for designating an image of a desired portion of the planer image, and a stereoscopic display control unit for displaying, on a stereoscopic display screen, stereo-pair images corresponding to the image of the designated portion by the input operating unit. The stereo-pair images are prepared in advance corresponding to the image of the designated portion. Alternatively, the stereo-pair images may be automatically generated for the partial image.

2 Claims, 21 Drawing Sheets

*FIG.12A*      *FIG.12B*
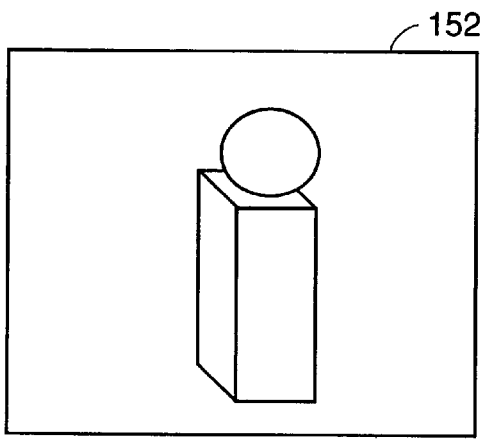
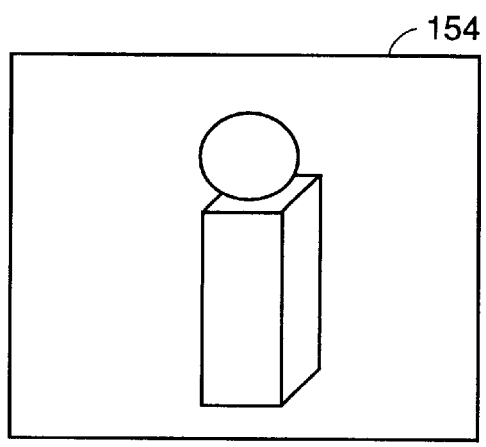

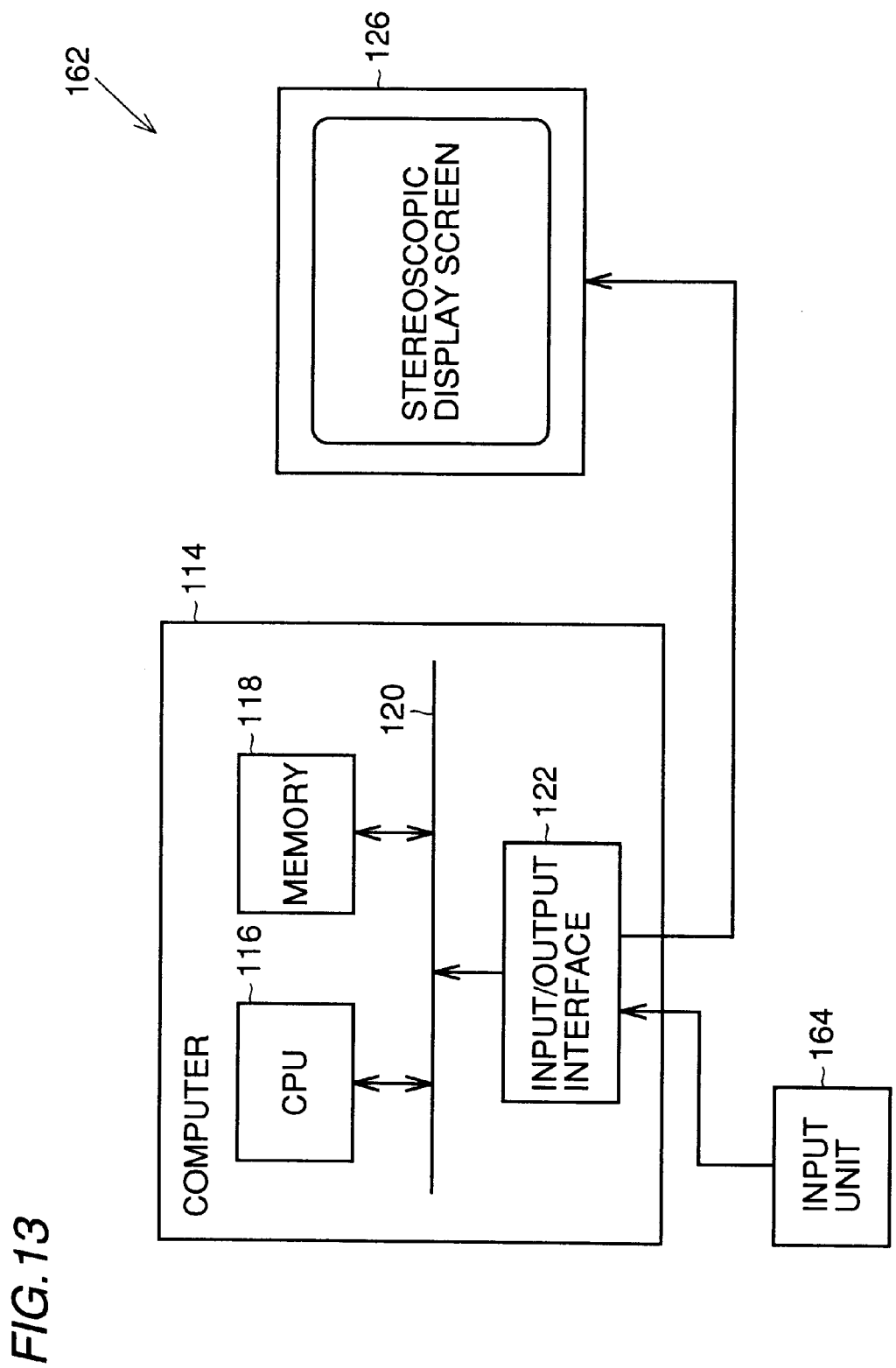

SPHERICAL SURFACE S

SPHERICAL SURFACE S

STEREOSCOPIC IMAGE DISPLAY APPARATUS CAPABLE OF SELECTIVELY DISPLAYING DESIRED STEREOSCOPIC IMAGE

BACKGROUND OF THE INVENTION

1. Field of the Invention

The present invention relates to a stereoscopic image displaying apparatus. More specifically, the present invention relates to a stereoscopic image displaying apparatus which forms or selects a stereoscopic image desired by the user for display.

2. Description of the Background Art

An image of an area in all directions over 360° taken by a camera positioned at the center is referred to as a panoramic image or a panorama.

FIGS. 1A and 1B are illustrations showing a method of cutting out and displaying part of conventional panoramic image data in an interactive way. FIG. 1A shows an example of a method of photographing to obtain panoramic image data. FIG. 1B shows a concept of cutting out and displaying a desired part of the panoramic image.

Referring to FIG. 1A, assume that a camera (subject) 32 is positioned at the center, viewing scenes therearound over 360°. Camera 32 rotates once with the direction changed, starting from position A. Accordingly, a series of planer image data Gi (i=1, 2, 3, . . . N) are obtained. Generally, overlapping portions of the data are removed and panoramic image data is obtained.

The user views the panoramic image data by using a planer display, and an image of a part, or a partial image, Ri is displayed on a planer display screen 36, if the central image Ri of the panoramic image data has represented in FIG. 1B is designated by a cursor.

Thus the user can cut out and display on a planer display 36 a desired image Ri from a series of panoramic image in an interactive manner, and can enjoy panoramic view of 360° on the display screen.

Another conventional system has been known in which a selected part of a displayed planer image is enlarged and displayed as if a zoom lens is used.

Further, among image data obtained through the network such as the Internet, there are real image data obtained by photographing objects of scenes from multiple points of view as well as CG data corresponding to multiple points of view (hereinafter referred to as "multi view point image data") in accordance with a format such as Quick Time VR (trademark of Apple Computer of the United States) or VRML (Virtual Reality Modeling Language). A system has been known which displays image data of an object or scene viewed from an arbitrary view point on an output device such as a display screen, utilizing the multi view point image data.

However, there has not been any system which displays a stereoscopic image based on existing image data such as the above described panoramic image.

SUMMARY OF THE INVENTION

Therefore, an object of the present invention is to provide a stereoscopic image displaying apparatus capable of providing a stereoscopic image display of a desired planer image, a method therefor, and a computer readable recording medium storing a program for the stereoscopic image display.

Another object of the present invention is to provide a stereoscopic image displaying apparatus capable of giving a stereoscopic display of an image of a selected portion of a planer image.

A still further object of the present invention is to provide a method of forming image data for stereoscopic display which allows formation of image data to be given as stereoscopic display, by using CG data.

A still further object of the present invention is to provide a method of forming image data for stereoscopic display which allows formation of image data to be given as binocular stereoscopic display, using CG data.

A still further object of the present invention is to provide an apparatus for forming image data for stereoscopic display, which allows formation of image data to be given as stereoscopic display, using CG data.

A still further object of the present invention is to provide an apparatus for forming image data for stereoscopic display, which allows, formation of image data to be given as binocular stereoscopic display, using CG data.

A still further object of the present invention is to provide a method of stereoscopic display which allows formation of image data to be given as stereoscopic display, using multi view point image data.

A still further object of the present invention is to provide a method of stereoscopic display which allows formation of image data to be given as stereoscopic display viewed from an arbitrary point, utilizing the multi view point image data.

A still further object of the present invention is to provide a method of stereoscopic display which allows formation of image data to be given as stereoscopic display which is free of any unnaturalness when viewed by a person, using multi view point image data.

A still further object of the present invention is to provide a method of stereoscopic display allowing formation of image data which can be given as binocular stereoscopic display.

A still further object of the present invention is to provide a stereoscopic display apparatus allowing formation of image data which can be given as stereoscopic display, using multi view point image data.

A still further object of the present invention is to provide a stereoscopic display apparatus allowing formation of image which can be given as stereoscopic display viewed from an arbitrary point, using multi view point image data.

A still further object of the present invention is to provide a stereoscopic display apparatus allowing formation of image data which can present stereoscopic image free of any unnaturalness when viewed by a person, using multi view point image data.

A still further object of the present invention is to provide a stereoscopic display apparatus allowing formation of image data which can be given as binocular stereoscopic display, using multi view point image data.

A still further object of the present invention is to provide a computer readable recording medium storing a stereoscopic display program to be executed by a computer for implementing a method of stereoscopic display allowing formation of image data tobe given as stereoscopic display using multi view point image data.

A still further object of the present invention is to provide a computer readable recording medium storing a stereoscopic display program to be executed by a computer for implementing a stereoscopic display method allowing formation of image data to be given as stereoscopic display viewed from an arbitrary point, using multi view point image data.

A still further object of the present invention is to provide a computer readable recording medium storing a stereoscopic display program to be executed by a computer for implementing a stereoscopic display method which allows formation of image data to be given as stereoscopic display free from any unnaturalness when viewed by a person, using multi view point image data.

A still further object of the present invention is to provide a computer readable recording medium storing a stereoscopic display program to be executed by a computer for implementing a stereoscopic display method which allows formation of image data to be given as binocular stereoscopic display, using multi view point image data.

The stereoscopic image display apparatus in accordance with an aspect of the present invention includes an input operating unit for designating an image of a desired portion of a planer image, and a stereoscopic display controlling unit for displaying on a stereoscopic display screen, stereo-pair images corresponding to the partial image designated by the input operating unit.

The stereo-pair images which allow stereoscopic view, corresponding to the designated partial image are generated. Therefore, the image of the desired portion of a planer image can be given as a stereoscopic image.

Preferably, the stereo-pair images maybe prepared in advance corresponding to the designated partial image.

By this structure, it becomes possible to readily display, simply by preparing in advance stereo-pair images for each of partial images of a planer image in advance, corresponding stereoscopic image on a stereoscopic display screen.

More preferably, the stereo-pair images may be generated for each partial image.

When this approach is taken, it becomes unnecessary to prepare the stereo-pair images in advance, and hence memory capacity therefor can be reduced.

More preferably, the planer image may be a panoramic image.

In this case, the panoramic image can be displayed as stereoscopic images in an interactive manner, and hence an apparatus suitable for the field of virtual walk-through application, for example, can be provided.

More preferably, the stereo-pair images may be data obtained through photographing by a stereo camera.

Therefore, the stereo-pair images can be obtained simply by photographing the image of the desired portion by a stereo camera, and therefore, a stereoscopic image corresponding to the partial image can readily be displayed.

More preferably, the stereo-pair images may be data obtained by distorting the partial image in accordance with a prescribed procedure.

Accordingly, the stereo-pair images corresponding to the image of the selected portion can be obtained by calculation, and hence stereoscopic image of the desired portion can readily be displayed.

Further, the stereo-pair images may be data formed by computer graphics for the partial image.

Accordingly, the stereo-pair images corresponding to the partial image can be formed by computer graphics, and hence stereoscopic image of the desired portion can readily be displayed.

According to another aspect, the method of displaying stereoscopic image in accordance with the present invention includes the steps of designating an image of a desired portion of a planar image, and displaying a stereoscopic image based on stereo-pair images corresponding to the designated partial image.

Therefore, each of the partial images of the planer image can be represented as a stereoscopic image.

The computer readable recording medium in accordance with a still further aspect of the present invention stores a program of the method of stereoscopic display for displaying, as a stereoscopic image, a desired portion of a planer image, including the steps of designating an image of a desired portion of a planer image, and displaying a stereoscopic image based on stereo-pair images corresponding to the designated partial image.

Therefore, it is possible to display each of the partial images of the planer image as a stereoscopic image.

According to a still further aspect, a method of forming image data for stereoscopic display used in the method of stereoscopic display using CG data includes the steps of setting a plurality of view points, and forming and outputting a plurality of image data viewed from respective ones of the plurality of view points using CG data.

As image data viewed from a plurality of view points are output, it is possible to form image data to be given as stereoscopic display, using CG data.

Preferably, the number of the aforementioned view points is two.

As image data viewed from two different view points are obtained, image data allowing binocular stereoscopic display can be formed.

An apparatus for forming image data for stereoscopic display used in a stereoscopic image data display system including the apparatus for forming image data for stereoscopic display using CG data and a stereoscopic display apparatus for giving stereoscopic display of the aforementioned image data includes a circuit for setting a plurality of view points, and an image data forming and outputting unit for forming and outputting a plurality of image data viewed from respective ones of the plurality of views points using CG data.

Since image data viewed from a plurality of view points are output, image data allowing stereoscopic display can be formed using the CG data.

Preferably, the number of the aforementioned view points is two.

As image data viewed from two different view points are obtained, image data allowing binocular stereoscopic display can be formed.

The method of stereoscopic display using multi view point image data consisting of a plurality of image data in accordance with a still further aspect of the present invention includes the steps of setting a plurality of view points, and forming and outputting a plurality of image data viewed from respective ones of the plurality of view points, using the multi view point image data.

As the plurality of views points are set and image data viewed from respective points are formed, it is possible to give stereoscopic display using the multi view point image data.

Preferably, the aforementioned step of forming and outputting the plurality of image data includes the steps of outputting, for each of the plurality of view points, when image data viewed from the view point exist in the multi view point image data, the corresponding image data, and forming and outputting, when the image data viewed from the view point does not exist among the multi view point image data, interpolated image data from image data viewed from view points near the view point of interest, among the plurality of multi view points image data.

When image data viewed from a set view point does not exist among the multi view point image data, the image data is formed by interpolating using peripheral image data. Accordingly, stereoscopic display viewed from an arbitrary view point is possible.

More preferably, the step of forming and outputting the plurality of image data includes the steps of outputting, when a plurality of cameras virtually set at the plurality of view points for taking the plurality of image data are in a prescribed relation, image data viewed from the plurality of view points, and converting image data viewed from the plurality of view points to image data which would be photographed by the plurality of cameras satisfying the prescribed relation, and outputting the converted image data, when the plurality of cameras do not satisfy the prescribed relation.

Accordingly, it is possible to convert image data to satisfy a prescribed relation and output the converted image, so that the image does not have any unnaturalness at the time of stereoscopic view.

The stereoscopic display apparatus using the multi view point image data consisting of a plurality of image data in accordance with a still further aspect of the present invention includes an input unit for setting a plurality of view points, and an image data forming and outputting unit for forming and outputting a plurality of image data viewed from respective ones of the plurality of view points set by the input unit, using the multi view point image data.

As the plurality of view points and image data viewed from the respective points are formed, it is possible to give stereoscopic display using the multi view point image data.

Preferably, the image data forming and outputting unit includes a circuit for outputting, for each of the plurality of view points set by the input unit, when the image data viewed from the view point exists among the multi view point image data, the corresponding image data, and a circuit for forming and outputting interpolated image data from image data viewed from view points near the view point of interest among the plurality of multi view point image data, when the image data viewed from the view point does not exist among the multi view point image data.

When the image data viewed from a set view point does not exist is the multi view point image data, interpolation is performed using image data of the periphery, and image is formed. Accordingly, image data allowing stereoscopic display viewed from an arbitrary view point can be formed.

More preferably, the image data forming and outputting unit includes a circuit for outputting, when a plurality of cameras set virtually at the plurality of view points for taking the plurality of image data satisfy a prescribed relation, the image data viewed from the plurality of view points, and a circuit for converting, when the plurality of cameras do not satisfy the prescribed relation, image data viewed from the plurality of view points to image data which would be taken by the plurality of cameras satisfying the prescribed relation, and outputting the converted image data.

The image data is converted to satisfy a prescribed relation and output, so that there is not any unnaturalness at the time of stereoscopic view.

The computer readable recording medium in accordance with a still further aspect of the present invention stores a stereoscopic display program to be executed by a computer for implementing the method of stereoscopic display for giving a stereoscopic display using multi view point image data consisting of a plurality of image data, which method includes the steps of setting a plurality of view points, and forming and outputting a plurality of image data viewed from respective ones of the plurality of view points using the multi view point image data.

When the plurality of view points are set, image data viewed from respective ones of the view points are formed, and therefore stereoscopic display using the multi view point image data is possible.

Preferably, the step of forming and outputting the plurality of image data includes the steps of outputting, for each of the plurality of view points, when the image data viewed from the view point exists among the multi view point image data, the corresponding image data, and forming and outputting, when the image data viewed from the view point does not exist among the multi view point image data, interpolated image data from the image data viewed from the view points near the view point of interest, among the plurality of image data of the multi view point image data.

When the image data viewed from a set view point does not exist among the multi view point image data, interpolating process is performed using image data of the periphery, and image data is formed. Therefore, it is possible to provide stereoscopic display viewed from an arbitrary view point.

More preferably, the step of forming and outputting the plurality of image data includes the steps of outputting, when a plurality of cameras arranged virtually at respective ones of the plurality of view points for taking the plurality of image data satisfy a prescribed relation, the image data viewed from the plurality of view points, and converting the image data viewed from the plurality of view points to image data which would be taken by the plurality of cameras satisfying the prescribed relation, and outputting the converted image data, when the plurality of cameras do not satisfy the prescribed relation.

Thus, it is possible to convert and output image data to satisfy the prescribed relation, so that there is not any unnaturalness at the time of stereoscopic view.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12A and 12B represent left and right image data, respectively, in accordance with the third embodiment.

FIG. 13 is a block diagram showing a configuration of a stereoscopic image data display system in accordance with a fourth embodiment.

DESCRIPTION OF THE PREFERRED EMBODIMENTS

First Embodiment

Embodiments of the present invention will be described in detail in the following, with reference to the figures.

In the present embodiment, part of planer panoramic image data is cut out in an interactive manner and displayed as a stereoscopic image. However, the planer image to be cut out is not limited to the panoramic image.

Figure 2:
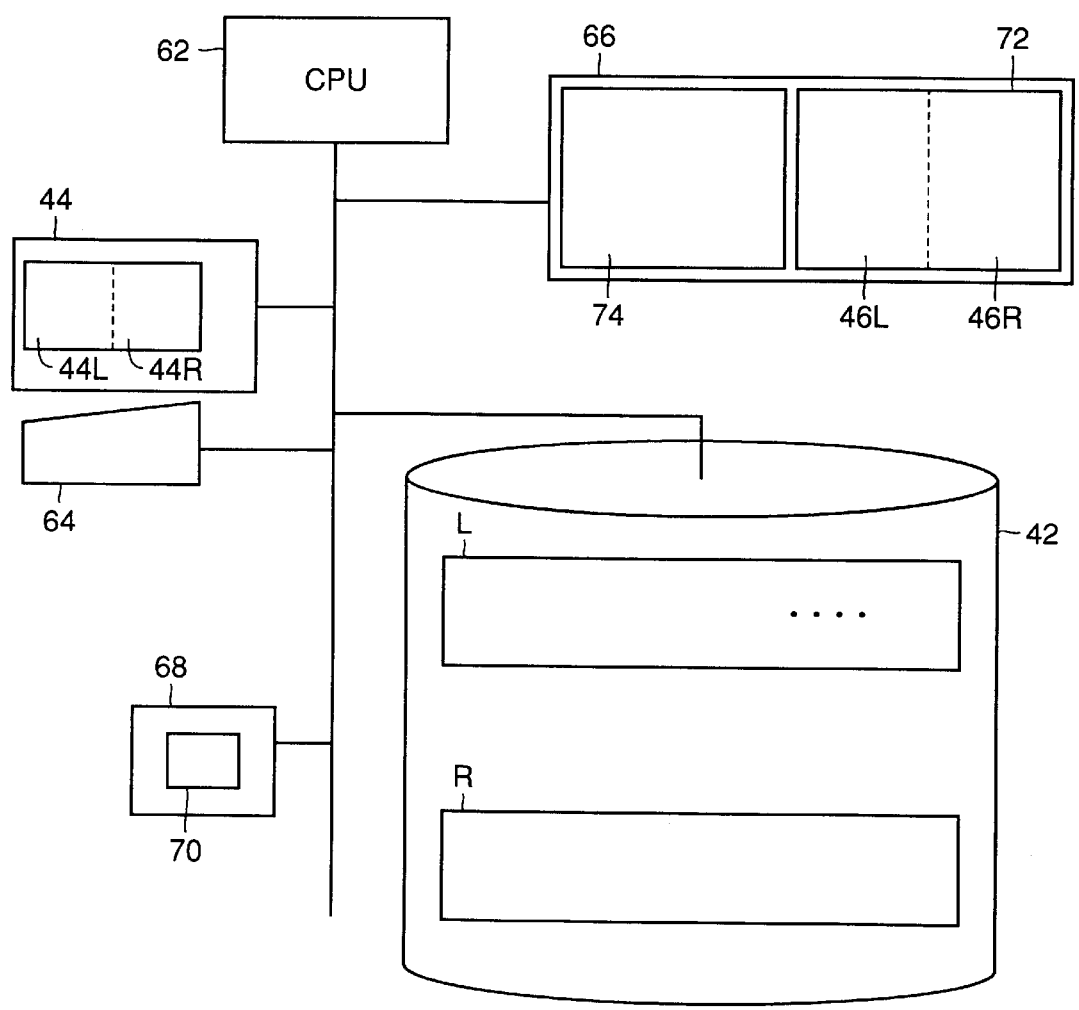
FIG. 2 shows a configuration of a stereoscopic image display apparatus in accordance with a first embodiment of the present invention.
Figure 4:
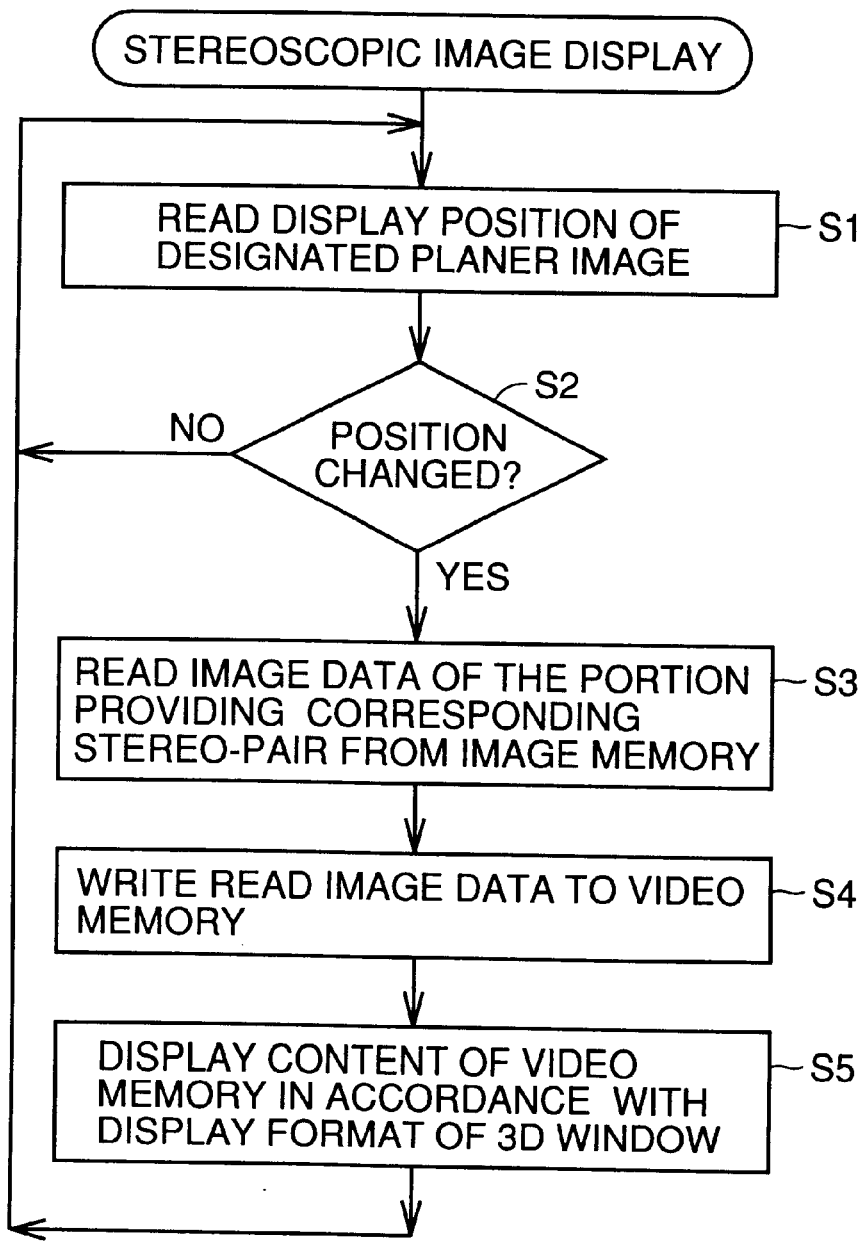
FIG. 4 is a flow chart of the stereoscopic image displaying process in accordance with the first embodiment.

Referring to FIG. 2, the stereoscopic image displaying apparatus includes a CPU 62 for controlling and supervising the apparatus, an input operating unit 64 including a keyboard for data input and a coordinate input unit such as a mouse for inputting a position on the screen by moving a cursor, a display screen 66 having a 3D area 72 which is a display area for the stereoscopic image and a 2D area 74 which is an area for displaying planer image, a video memory 44 including image memories 44L and 44R for the left and right eyes, respectively, an image memory 42 storing panoramic series of image data for the left eye and image data for the right eye associated with each other to provide stereo-pair images, and a memory 68 storing as a program 70, the flow chart of FIG. 4, which will be described later.

In the illustrated example, display area of one same display screen 66 is divided into 2D area 74 and 3D area 72 and shared. A planer display for displaying planer images and a stereoscopic display for displaying stereoscopic images may be provided separately. In the following, an example in which the stereoscopic display is provided separately will be described. The stereoscopic display is well known and described in detail in Ken Matsutani et al.: "New Autostereoscopic (No-Glasses LCD Image Splitter Displays," 3D Image Conference '96 pp. 90–95, for example.

Figure 3B:
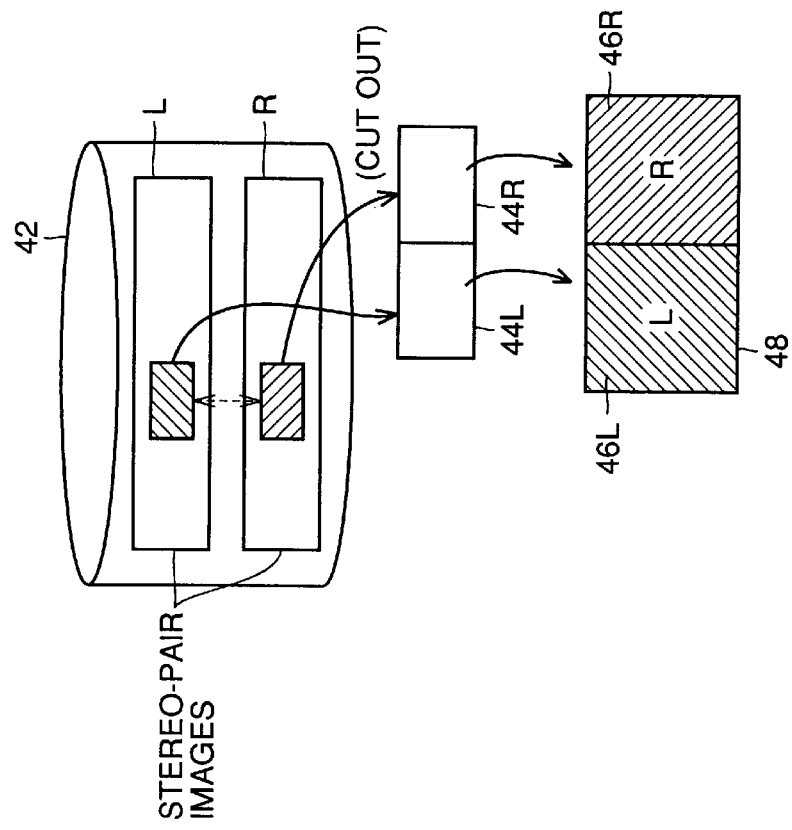
FIGS. 3A and 3B are illustrations related to the method of cutting out and giving stereoscopic display of part of the panoramic image data in an interactive manner, in accordance with the first embodiment.
Figure 3A:
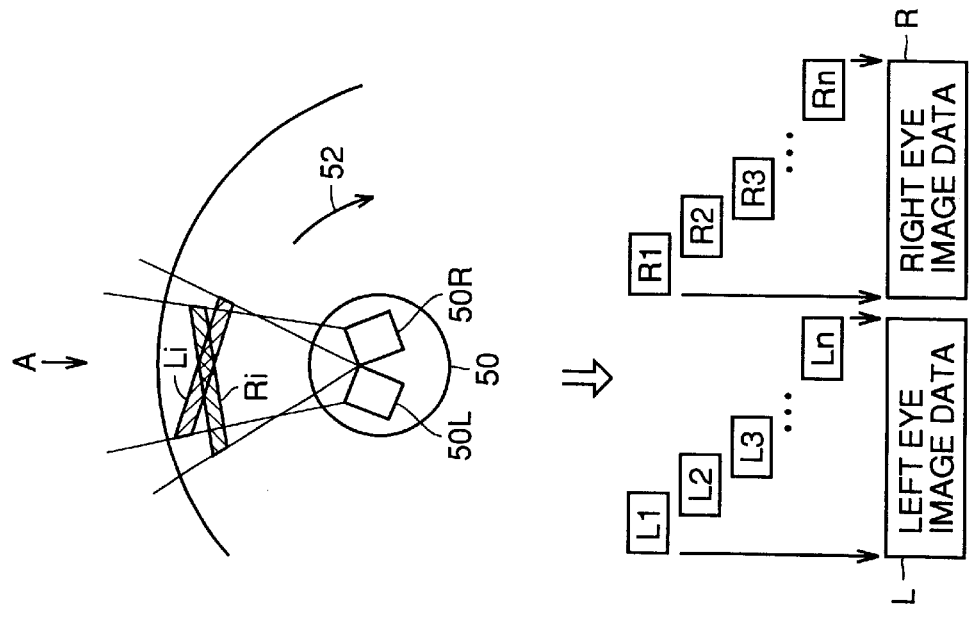

FIG. 3A shows a method of photographing or image pickup to obtain panoramic image data which allows stereoscopic display, and FIG. 3B shows a concept of cutting out and giving stereoscopic display of a desired portion of the panoramic image data.

Referring to FIG. 3A, assume that a stereoscopic camera 50 (subject) including a left eye camera 50L and a right eye camera 50R picking up images in photographing directions with prescribed parallax is positioned at the center, and scenes therearound is viewed over 360°. Stereoscopic camera 50 rotates once while taking photographs starting from position A and moving in the direction of the arrow 52. Accordingly, panoramic series of left eye image data L and panoramic series of right eye image data R constituting stereo-pair images with prescribed parallax can be obtained. The obtained left eye image data L and right eye image data R are stored in image memory 42 of the apparatus with image data constituting each stereo-pair associated with each other, as shown in FIG. 3B. Here, image data picked up at each of the view points constituting the panoramic series of image data L and R will be referred to as Li and Ri, respectively.

Thereafter, by using an input unit such as a mouse, cutting out of a part of the panoramic image can be designated in an interactive manner from the panoramic series of image data L and R, as shown in FIG. 3B.

When a part of image data R is designated to be cut out as shown in FIG. 3B, image data R and corresponding portion of image data L constituting the stereo-pair images are successively read from image memory 42, as shown in FIG. 3B, successively written to image memory 44R for the right eye and image memory 44L for the left eye, and displayed on stereoscopic display 48. Namely, part of the panoramic image is cut out in an interactive manner and corresponding stereo-pair images are displayed on the stereoscopic display 48. In this manner, it is possible for the user to see the desired portion of the planer image turned to stereoscopic image, in the interactive manner.

In order to synchronize left eye image for updating and right eye image for updating, two buffers may be provided. More specifically, in response to cutting out of images in the interactive manner shown in FIG. 3B, if part of the left eye image data L of the corresponding stereo-pair images is read from memory 42 and displayed on the left eye image area 46L on the stereoscopic display 48 and thereafter part of the right eye image data R is read from image memory 42 and displayed on the right eye image area 46R of stereoscopic display 48, displays of the left and right images would be out of timing. Therefore, the displayed image on stereoscopic display 48 would not be the stereo-pair images.

Accordingly, two buffers are provided between image memory 42 and stereoscopic display 48. Before giving a display on stereoscopic display 48, respective ones of the stereo-pair image data read from image memory 42 are successively written to the first buffer, and until the end of writing, content of the second buffer is displayed on stereoscopic display 48. In this manner, corresponding stereo-pair images are displayed in synchronization with interactive cutting out by the user without fail on the stereoscopic display 48, and thus desired stereoscopic image can be provided.

The process for displaying stereoscopic images by the stereoscopic image displaying apparatus shown in FIG. 2 will be described with reference to the flow chart of FIG. 4. The program 70 in accordance with the flow chart of FIG. 4 is read and executed under the control of CPU 62. The panoramic series of left eye image data L and right eye image data R picked up in accordance with the manner shown in FIG. 3A are assumed to be stored in image memory 42 in advance.

First, the user moves a cursor on window 74 by moving a mouse or the like of input operating unit 64 while monitoring parts of panoramic image data R and L displayed on 3D area 72 of display 66, and requests cutting out of a desired portion of the image of the image data R and L which corresponds to the direction and the amount of movement of the cursor. In response to the request, CPU 62 reads the displayed position of designated image data R and L, that is, reads the cursor position at that time, (S1). If the rear cursor position is not changed from the last position (NO in S2), no operation is performed, and the flow again returns to reading of cursor position.

If it is determined by the CPU 62 that the cursor position has been changed from the last position (YES in S2), the process proceeds to display of the data of the stereo-pair images for the designated portion on 3D area 72.

First, the partial image data which are to be the stereo-pair of the image data at the position designated to be cut out are read by CPU 62 from image memory 42 (S3), written to left eye and right eye video memories 44L and 44R (S4), and contents of the video memories are displayed on 3D area 72 in accordance with a display format (S5).

When the image data read from the image memory 42 described above is to be displayed on 3D area 72, rearrangement and size conversion of the image are performed in accordance with the display format of 3D area 72.

Figure 5A:
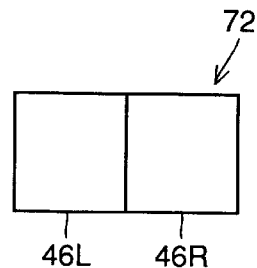
FIGS. 5A and 5D show examples of image display formats on a 3D window of a display shown in FIG. 2.

In FIG. 5A, the area of 3D area 72 is divided in the horizontal direction into left eye image display area 46L and right eye image display area 46R as shown in FIG. 2, and at the time of image display, size conversion and rearrangement are performed so that image data Li and Ri are displayed side by side in the left and right positions in the horizontal direction.

Figure 5B:
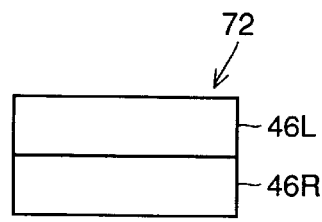
Figure 5C:
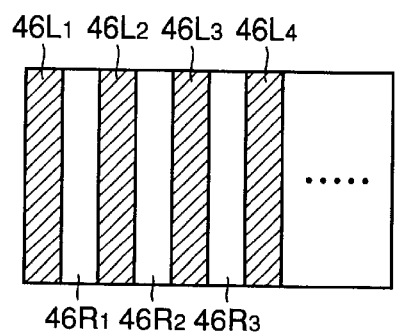
Figure 5D:
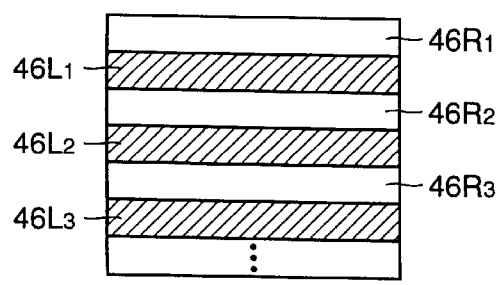

When image data Li and Ri are to be displayed side by side in upward and downward directions on 3D area 72 as shown in FIG. 5B, size conversion and rearrangement of image data are performed in the similar manner. Stereoscopic display on 3D area 72 is possible using image data of such format. Further, image data L and R may be displayed on 3D area 72 in such formats as shown in FIG. 5C and 5D, by dividing, size converting and rearranging the image data.

As described above, according to the present embodiment, it is possible to provide stereoscopic image of a desired planer image by cutting out corresponding portions of the stereo-pair images L and R designated interactively by a mouse, for example, and simultaneously displaying this on 3D area 72.

Further, it is possible to designate cutting out of an image of a portion of the planer image of either the image data R or L displayed on 2D area 74 of display 66. In this case, planer partial image data of either image data R or L at the position corresponding to the direction and amount of movement of the input unit such as a mouse on 2D area 74 is designated to be cut out, and image data of the corresponding portion to be the stereo-pair is read from image memory 42 and displayed as a stereoscopic image on 3D area 72.

Though binocular stereoscopic view has been described as an example of stereoscopic image in the present embodiment, the present invention is similarly applicable to stereoscopic view of three or more view points.

In the present embodiment, image data to form the stereo-pair have been photographed by a stereo camera, for example, and prepared in advance. However, one image of the stereo-pair of an image of interest may be formed by deforming the other image, using known image distorting process.

As panoramic planer image can be displayed in stereoscopic and interactive manner, an apparatus specially suitable in the field of work through is provided.

Second Embodiment

Figure 1A:
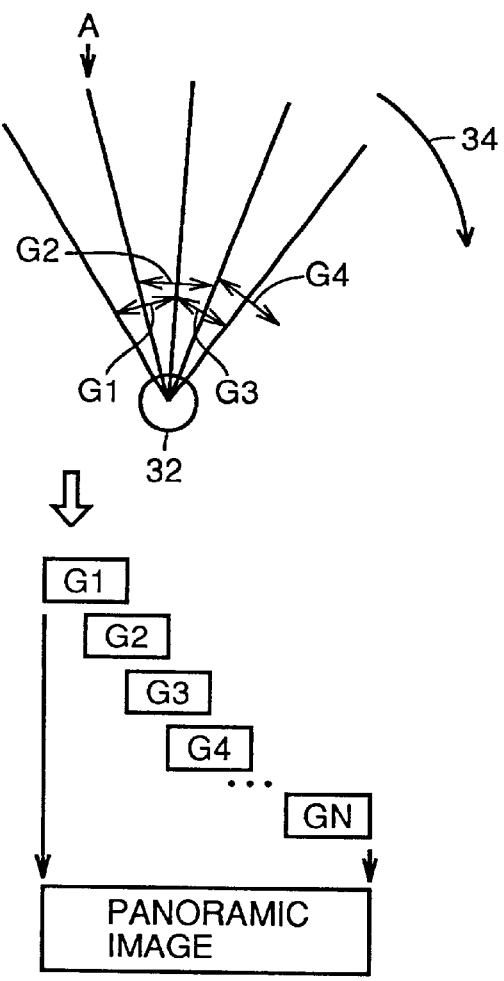
FIGS. 1A and 1B are illustrations related to a method of cutting out and displaying part of the conventional panoramic image data in an interactive manner.
Figure 1B:
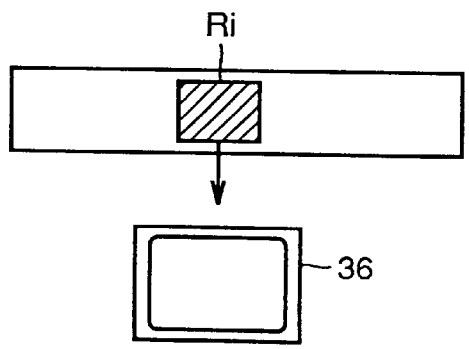
Figure 6:
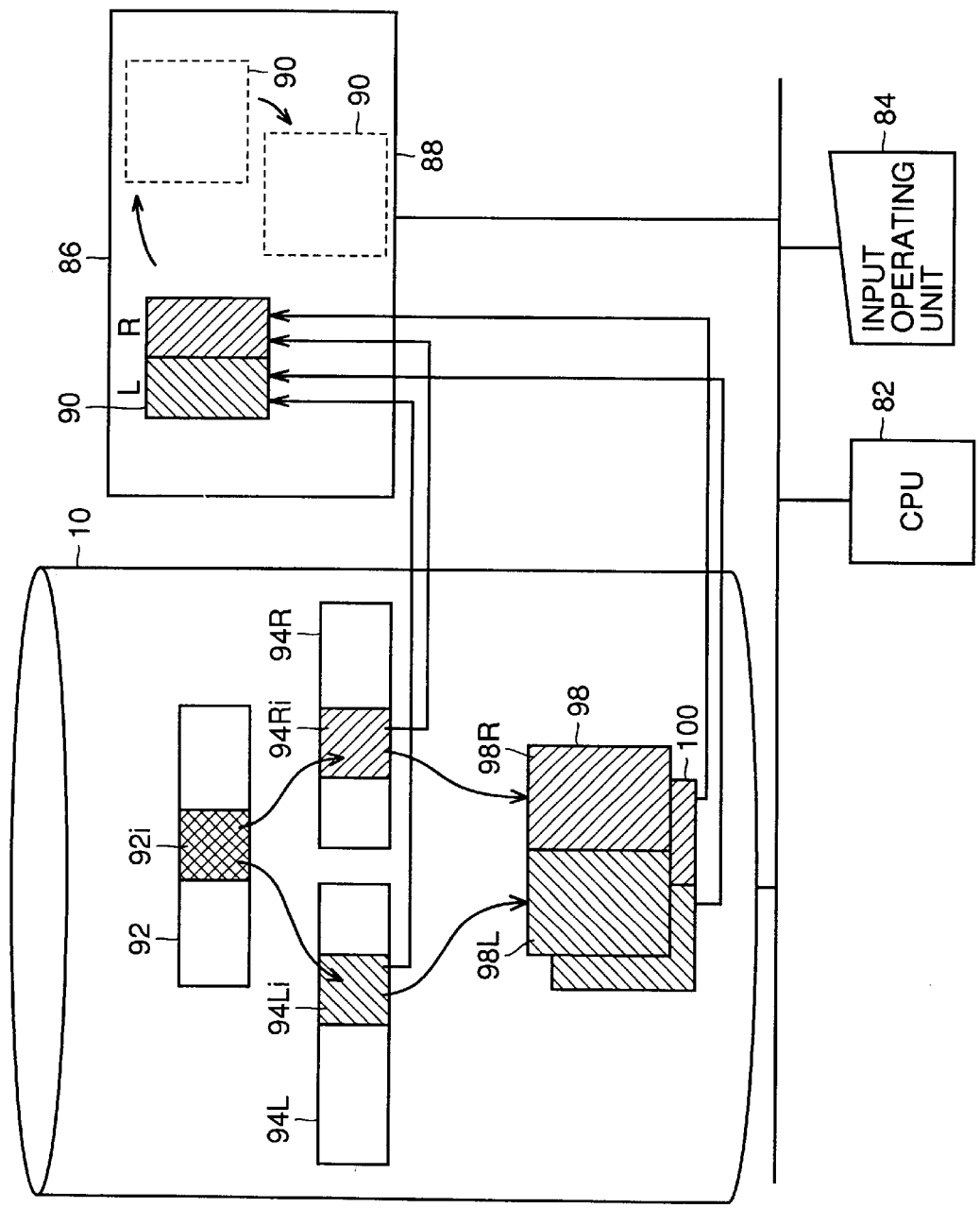
FIG. 6 shows a configuration of a stereoscopic image display apparatus in accordance with a second embodiment.

Referring to FIG. 6, the stereoscopic image display apparatus in accordance with the second embodiment includes a CPU 82 for controlling and supervising in centralized manner the apparatus itself, an input operating unit 84 including a keyboard, a mouse or the like, a display 86 similar to that of FIG. 1 allowing display of a 2D window 88 and a 3D window 90, and a memory 102 storing image data and so on.

Memory 102 contains image data 92 to be displayed on 2D window 88 including image data of a plurality of portions, or partial image data, 92$i$ (i=1, 2, 3, . . .), image data of stereo-pair images 94L and 94R having prescribed parallax prepared in advance based on image data 92, and buffers 98 and 100.

Image data 94L and 94R of the stereo-pair images include image data 94Li and 94Ri of stereo-pair images corresponding to partial image data 92$i$. Image data 94Li and 94Ri of the stereo-pair images are obtained by picking up or photographing the image of image data 92$i$ of the corresponding portion by means of a stereo camera in advance.

Buffers 98 and 100 have identical structure and provided for buffering difference in speed of reading data from memory 102 and speed of updating display on display 86. More specifically, when content of one buffer, for example buffer 100, is displayed on 3D window 90, newly selected image data 94Li and 94Ri of the stereo-pair images are written successively in left eye area 98L and right eye area 98R of the other buffer, for example buffer 98, prior to display on 3D window 90, and when writing of image data of the stereo-pair images to buffer 98 is completed, the content of buffer 98 is displayed in place of the content of buffer 100, on 3D window 90. Therefore, image data forming the stereo-pair can be displayed correctly without fail on 3D window 90.

Figure 7A:
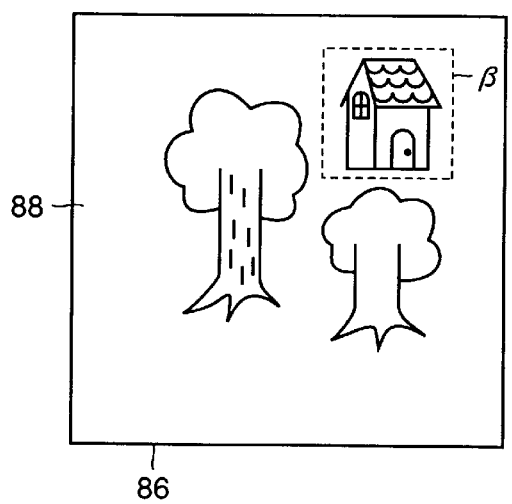
FIGS. 7A and 7B show concepts of the method of stereoscopic image display in accordance with the second embodiment.
Figure 7B:
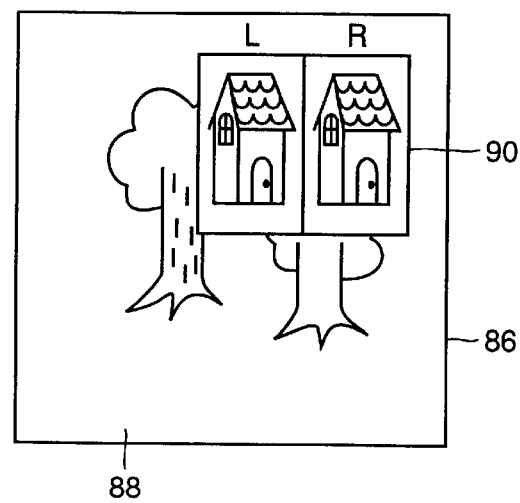

Referring to FIGS. 7A and 7B, according to the manner of displaying the stereoscopic image in accordance with the present invention, when a portion of a planer image displayed on 2D window 88 displaying planer image on display 86 is selected in accordance with an operation of input operating unit 84 such as a mouse or a keyboard, a 3D window 90 of a prescribed size for displaying the stereoscopic image is set at an area corresponding to the selected portion of 2D window 88, and stereoscopic image of the selected portion is displayed thereon.

More specifically, when an image β of a portion surrounded by the dotted line of planer image displayed on 2D window 88 of display 86 is selected, 3D window 90 appears at the area corresponding to the selected portion of 2D window 88 as shown in FIG. 7B, and stereoscopic image of image β, that is, left eye image L and right eye image R, which constitute the stereo-pair images with prescribed parallax corresponding to image β of the selected portion are displayed on window 90.

3D window 90 appearing in 2D window 88 moves arbitrarily and interactively in 2D window 88 in accordance with the operation of a mouse or a keyboard of the input operating unit 84, and therefore it is possible to interactively cut out an image displayed on window 88 and display the image of the designated portion as a stereoscopic image on 3D window 90.

Figure 8:
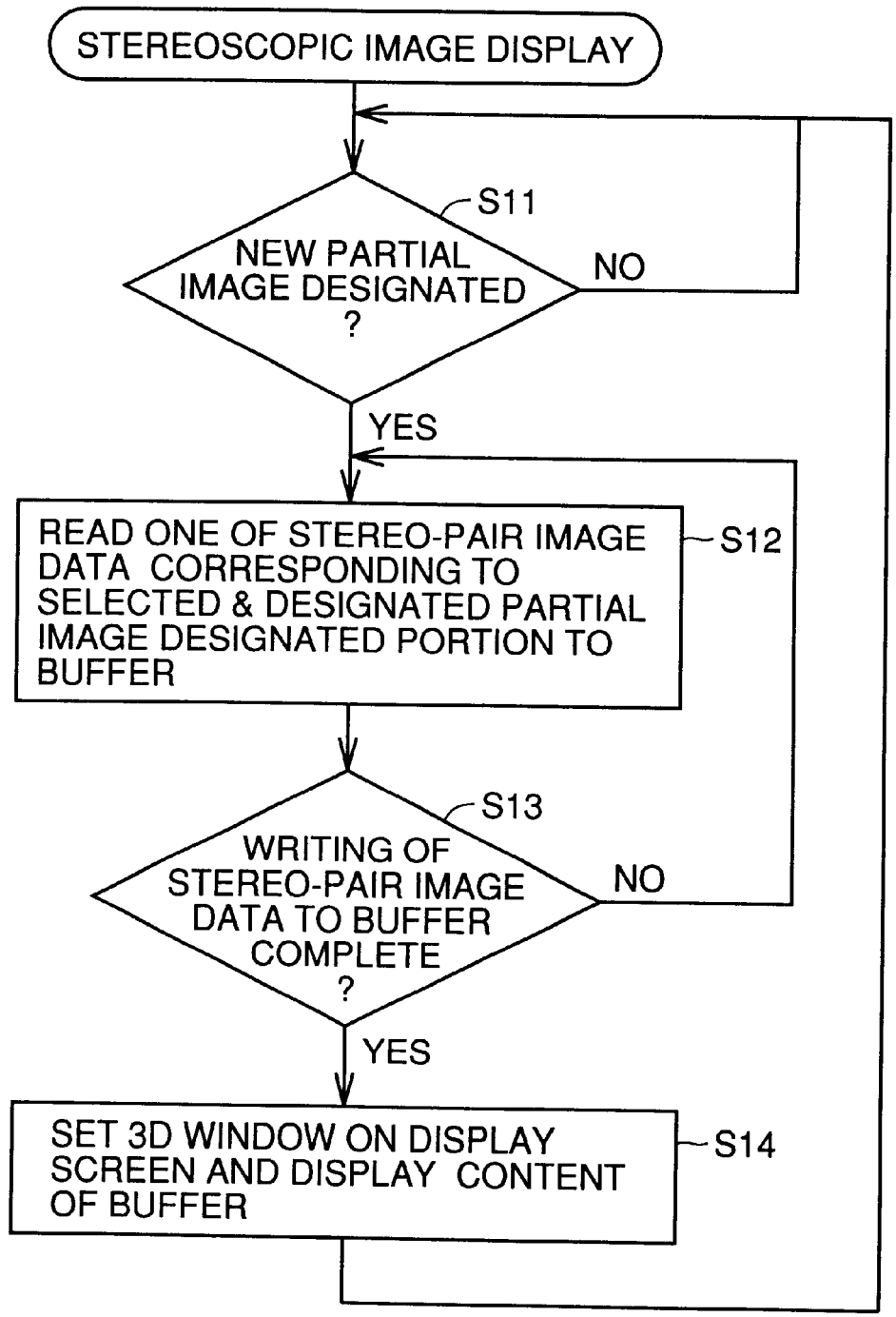
FIG. 8 is a flow chart showing a process of stereoscopic image display by the stereoscopic image display apparatus shown in FIG. 6.

The process for displaying the stereoscopic image will be described with reference to the flow chart of FIG. 8.

It is assumed that the content of buffer 100 is displayed on 3D window 90 designated immediately before, on display 86.

First, CPU 82 determines whether or not an image of a new portion of the planer image on 2D window 88 of display 86 is selected and designated by the user's operation of the input operating unit 84. When it is determined that an image of a new portion is not selected nor designated (NO in S11), this step (S11) is repeated until an image of a new portion, or new partial image, is selected and designated.

When it is determined that a new partial image is selected and designated (YES in S11), one of image data 94Li and 94Ri of the stereo-pair images corresponding to the selected and designated partial image data 92$i$ is written to the corresponding one of areas 98L and 98R of buffer 98 (S13). Thereafter, whether writing of the selected image data 94Li and 94Ri of the stereo-pair images to buffer 98 is completed or not is determined (S14).

When only one of selected image data 94Li and 94Ri of the stereo-pair images has been written in buffer 98, it is determined that the writing to buffer 98 is not complete (NO in S13), and the other image data which forms the pair with one image data already written in buffer 98 is written to buffer 98 (S12).

Accordingly, it is determined that writing of image data 94Li and 94Ri of the selected stereo-pair images to buffer 98 is completed (YES in S13), and therefore, content of buffer 98 is displayed on 3D window 90 set in display 86, in place of the content of buffer 100 which has been displayed so far (S14). Thereafter, the process returns to the step S11, and thereafter, similar processing is repeated.

In the present embodiment, image data 94L and 94R forming stereo-pairs of images of image data 92 are prepared in advanced by photographing using a stereo camera, and the prepared data are stored in memory 102. However, image data 92 may be subjected to well known distortion and correction process and stored in memory 102. Alternatively, corresponding image data 94L and 94R of the stereo-pair images may be prepared in advance by using computer graphics, and the data may be stored in memory 102. Further, image data 94Li and 94Ri for the corresponding stereo-pair images may be obtained by the aforementioned distortion correcting process every time a partial image data 92$i$ is selected and designated.

As described above, according to the present embodiment, an image of a portion selected and designated of the planar image displayed on 2D window 88 can be displayed as a stereoscopic image in 3D window 90 which appears at the corresponding display area. Further, the selected and designated area for the 3D window 90 can be moved arbitrarily and interactively in 2D window 88 by the operation of input operating unit 84.

Third Embodiment

A stereoscopic image data display system 112 in accordance with the third embodiment will be described with reference to FIG. 2.

Figure 9:
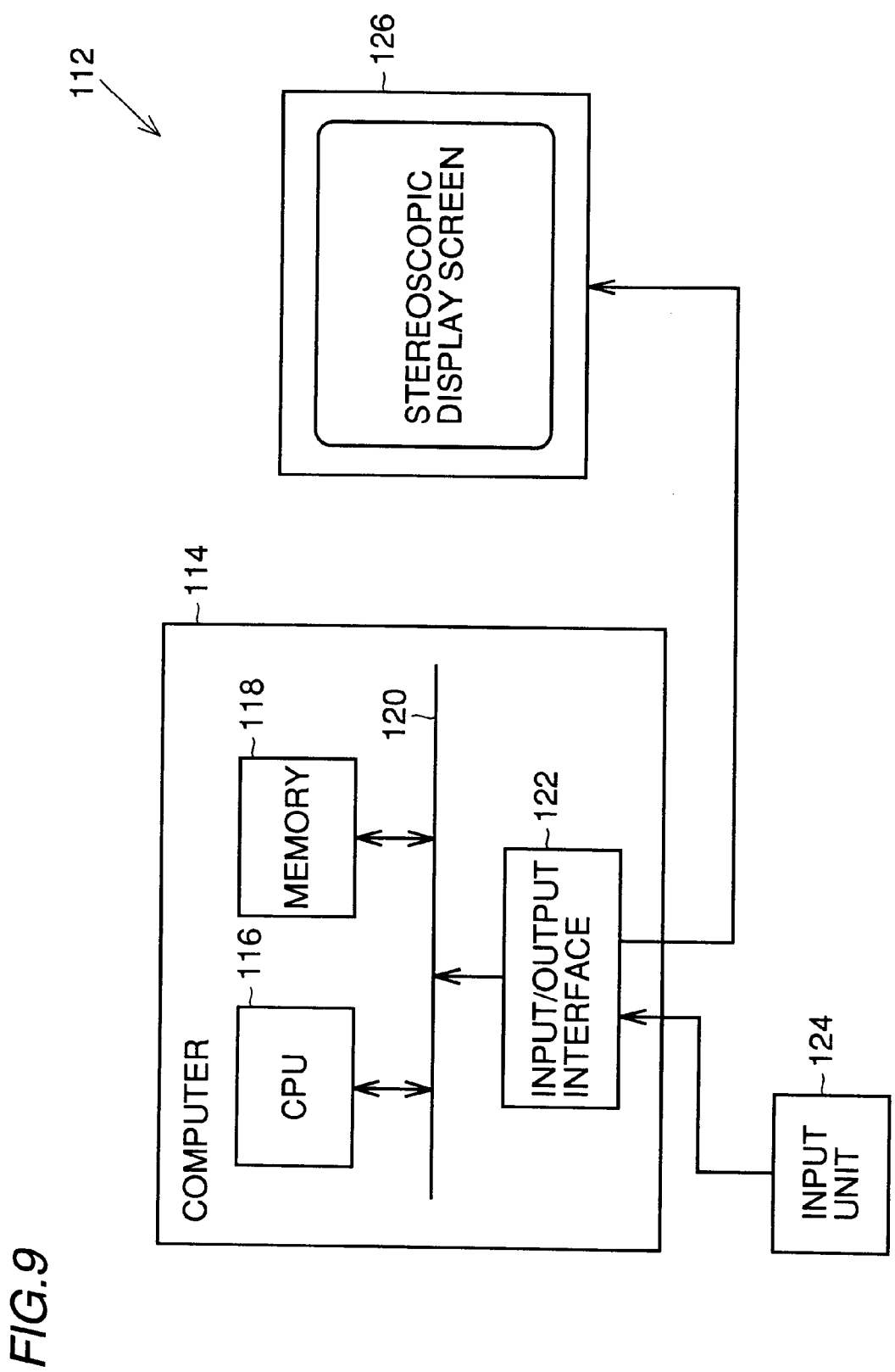
FIG. 9 is a block diagram showing a configuration of a stereoscopic image data display system in accordance with a third embodiment.

Referring to FIG. 9, stereoscopic image data display system 112 includes an input unit 124 for setting left and right view points, a computer 114 connected to input unit 124 for forming two image data viewed from the left and right view points, and a stereoscopic display screen 126 connected to computer 114, receiving two image data and synthesizing the two image data in an internal circuitry for giving a stereoscopic display.

Computer 114 includes a memory 118 for storing CG data in accordance with VRML format or the like, a processing program intermediate results of processing and so on, a CPU (Central Processing Unit) 116 for executing the process of forming two image data in accordance with the process program stored in memory 118, an input/output interface 122 connected to stereoscopic display screen 126 and input unit 124 for controlling exchange of input values and image data, and a bus 120 for connecting CPU 116, memory 118 and input/output interface 112 to each other. CG data is, for example, existing image data which can be obtained through the Internet, for example.

Figure 10:
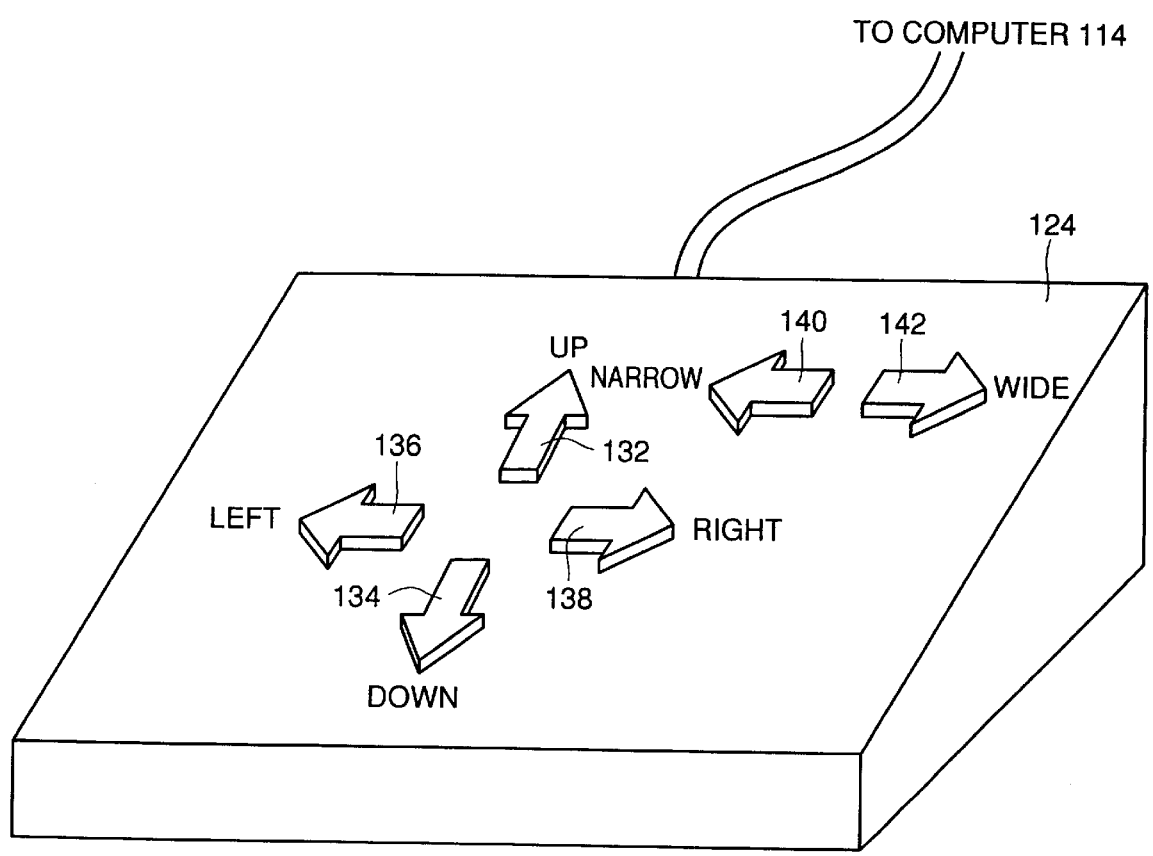
FIG. 10 shows an appearance of an input unit shown in FIG. 9.

Referring to FIG. 10, input unit 124 includes a left button 136, a right button 138, an up bottom 132 and a down button 134 for moving left and right view points to the left, right, up and down, in corresponding manner, and in addition, a widening button 142 and a narrowing button 140 for making wider or narrower the distance between the left and right view points. The structure of input unit 124 is not limited to this example. A unit which allows change of left and right view points independent from each other may be used. A unit which allows movement of view point in visual line direction may be used. Alternatively, existing input device such as a mouse or a keyboard may be used.

Figure 11:
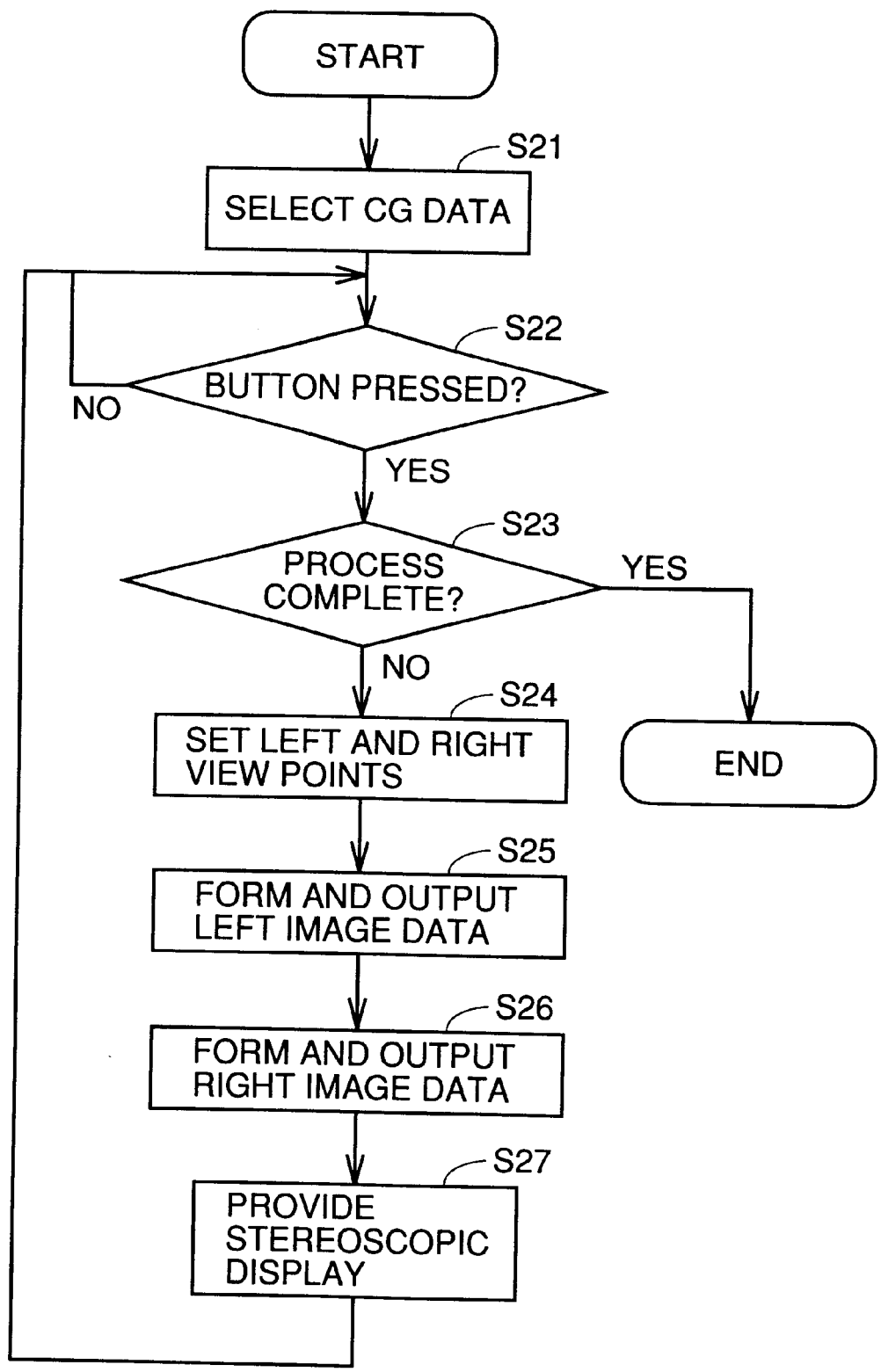
FIG. 11 is a flow chart showing a process performed in the stereoscopic image data displaying system in accordance with the third embodiment.

Referring to FIG. 11, the process executed by stereoscopic image data display system 112 will be described. By using input unit 124, a desired one of CG data stored in memory 118 is selected (S21). For example, the user browses through CG data viewed from prescribed view points and rendered, successively displayed on planer display on stereoscopic display screen 126, and the user selects desired one by pressing any of the buttons.

Thereafter, whether any of the buttons is pressed or not is determined (S22). If no button has been pressed (NO in S22), the flow waits until pressing of any button (S22). If a button is pressed (YES in S22), whether the process should be terminated or not is determined (S23). For example, when up button 132 and left button 136 are pressed simultaneously, the process is terminated (YES in S23) and, otherwise, the process continuous (NO in S23).

When the process is not to be terminated (NO in S23), left and right view points are set manually by the user, or set automatically by the computer (S24). The left and right view points are represented by the latitude δ and longitude α of spherical coordinate system. Namely, the left view point is represented as (δ, αL), and the right view point is represented as (δ, αR). In the present embodiment, latitude δ may or may not be the same for the left and right view points. Setting of the view points is performed by input unit 124. Thereafter, referred to FIG. 12, image data 152 viewed from the left view point is formed by a prescribed processing such as rendering on CG data, and the formed data is output through input/output interface 122 (S25). Image data 154 viewed from the right view point is also formed in the similar manner as in S25, and the formed data is output through input/output interface 122 (S26). The stereoscopic display screen 126 receiving left and right image data 152 and 154 synthesize the left and right image data 152 and 154 therein, and presents stereoscopic display (S124). Thereafter, the flow returns to S22.

In the present embodiment, binocular stereoscopic view has been described. It is possible, however, to provide a structure allowing multi view point stereoscopic view having three or more view points. In that case, computer forms image data viewed from three or more view points in the similar manner as the left and right image data described above. Further, in place of input unit 124, an input unit allowing setting of the plurality of view points is used, and a display allowing multi view point stereoscopic display is used instead of stereoscopic display screen 126.

By the stereoscopic image data display system 112 as described above, stereoscopic display is provided in a simple manner utilizing existing CG data.

Fourth Embodiment

A stereoscopic image data display system 162 (FIG. 13) in accordance with another embodiment of the present invention will be described.

Referring to FIG. 13, stereoscopic image data display system 162 includes an input unit 164 for setting left and right view points, a computer 114 connected to input unit 164 for forming two image data viewed from left and right view points, and a stereoscopic display screen 126 connected to computer 114, receiving two image data, and synthesizing the two image data in an internal circuitry for stereoscopic display.

Computer 114 includes a memory 118 for storing multi view point image data in accordance with Quick Time VR format or the like, processing program, intermediate results of processing and so on, a CPU 116 for executing the process of forming two image data in accordance with the process program stored in memory 118, an input/output interface 122 connected to stereoscopic display screen 126 and input unit 164 for controlling exchange of input values and image data, and a bus 10 for connecting CPU 11, memory 118 and input/output interface 112 with each other.

Figure 14:
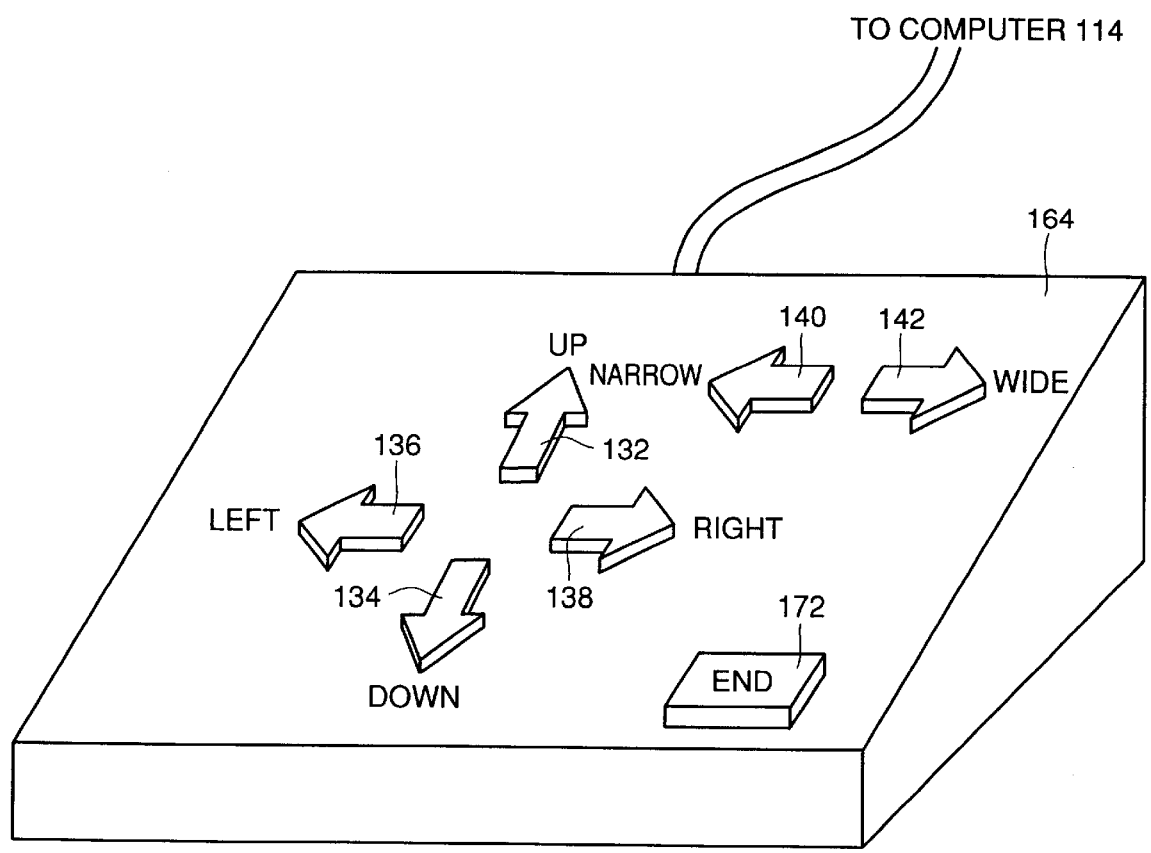
FIG. 14 shows an appearance of an input unit shown in FIG. 13.

Referring to FIG. 14, input unit 164 includes a left button 136, a right button 138, an up button 132 and a down button 134 for moving the left and right view points to the left, right, up and down correspondingly, a widening button 142 and a narrowing button 140 for widening and narrowing distance between the left and right view points, respectively, and an end button 172 for terminating the process. Input unit 164 is not limited to this example. A unit which allows change of left and right view points independently from each other may be used. An existing input device such as a mouse, a keyboard or the like may be used.

Figure 15:
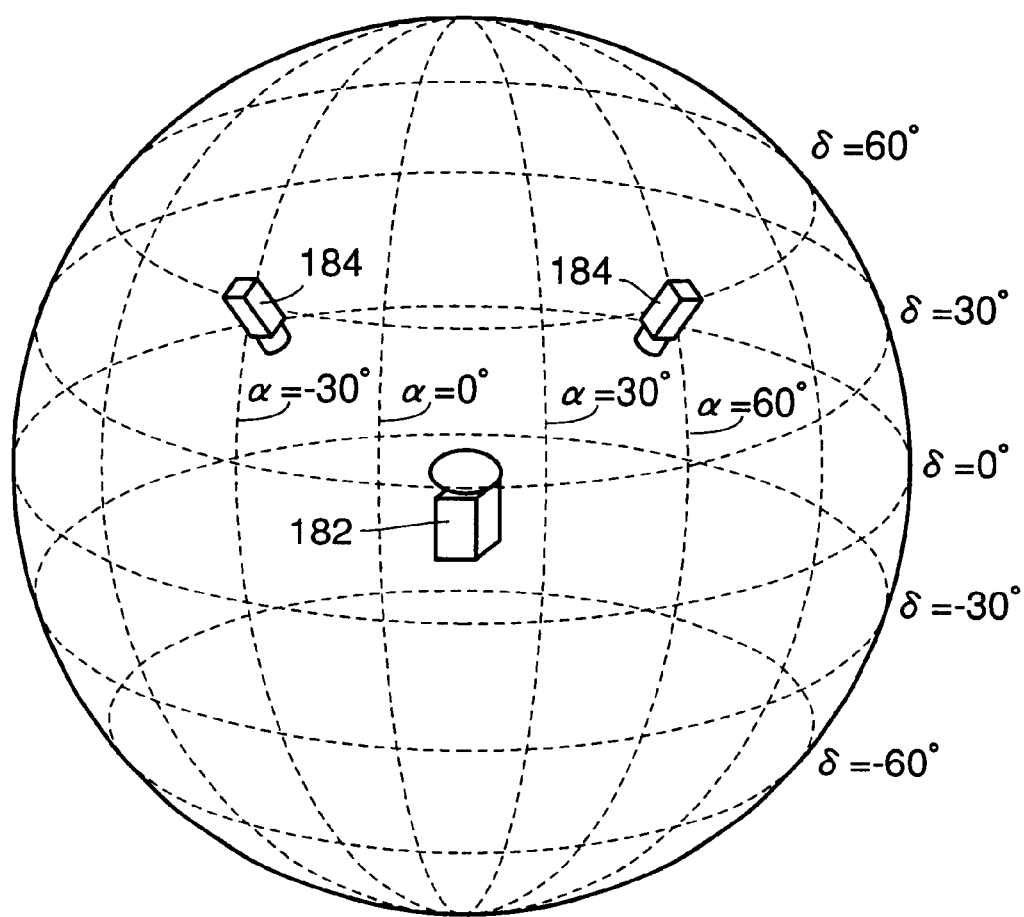
FIG. 15 shows a method of forming multi view point image data in accordance with the fourth embodiment.
Figure 16:
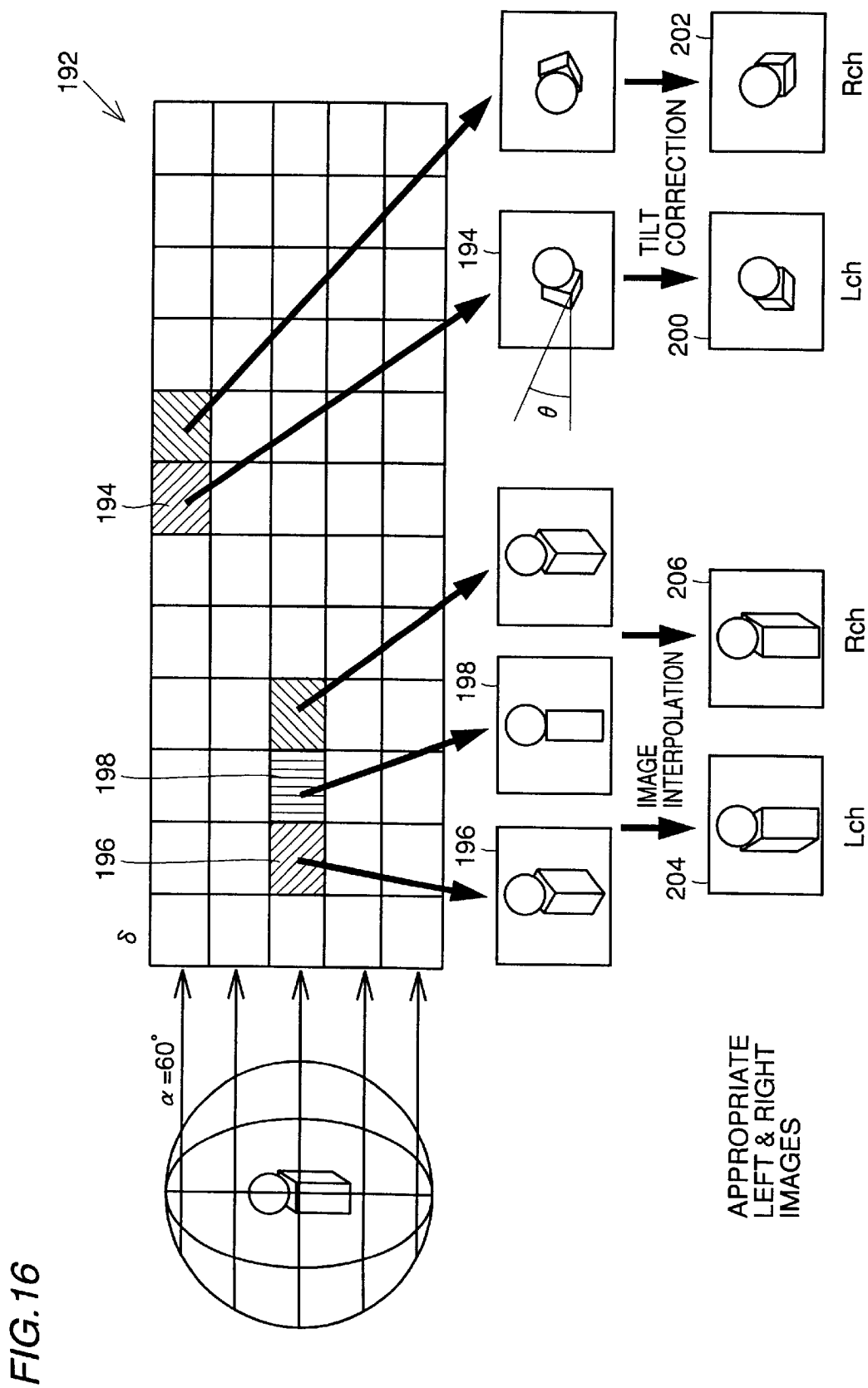
FIG. 16 shows the multi view point image data and image data from left and right view points formed by the multi view point image data, in accordance with the fourth embodiment.

Referring to FIGS. 15 and 16, multi view point image data will be described. Assume a spherical coordinate system such as shown in FIG. 15. Here, latitude is represented by δ and longitude is represented by α. An object 182 to be photographed is placed at the center of the spherical coordinate system. Further, a virtual camera 184 is arranged at each lattice point position on the surface of the sphere such that the camera is directed to the center of the spherical coordinate system and that the vertical and horizontal directions of the pickup image data correspond to the longitude and latitude, respectively. In this example, lattice points are represented by the combination of the following values of (five different) δ and (twelve different) α (60 combinations= 5×12).

$$\delta = (m \times 30)° \text{(where m is an integer satisfying } -2 \leq m \leq 2) \quad (1)$$

$$\alpha = (n \times 30)° \text{(where n is an integer satisfying } -5 \leq n \leq 6) \quad (2)$$

FIG. 15 shows arrangement of cameras 184 at (δ,α)=(60°, −30°) and (δ,α)=(60°, 60°).

Referring to FIG. 16, when object 182 is photographed by camera 184 arranged at each lattice point, multi view point image data 192 taken from 60 different view points can be obtained. The multi view point image data 192 formed by this method can readily be obtained through the Internet, for example. The multi view point image data 192 is stored in memory 118. FIG. 16 is an example developing the multi view point image data, and the images viewed from respective view points are not always stored in the order as shown in FIG. 16 when the data is subjected to image compression, for example.

Figure 17:
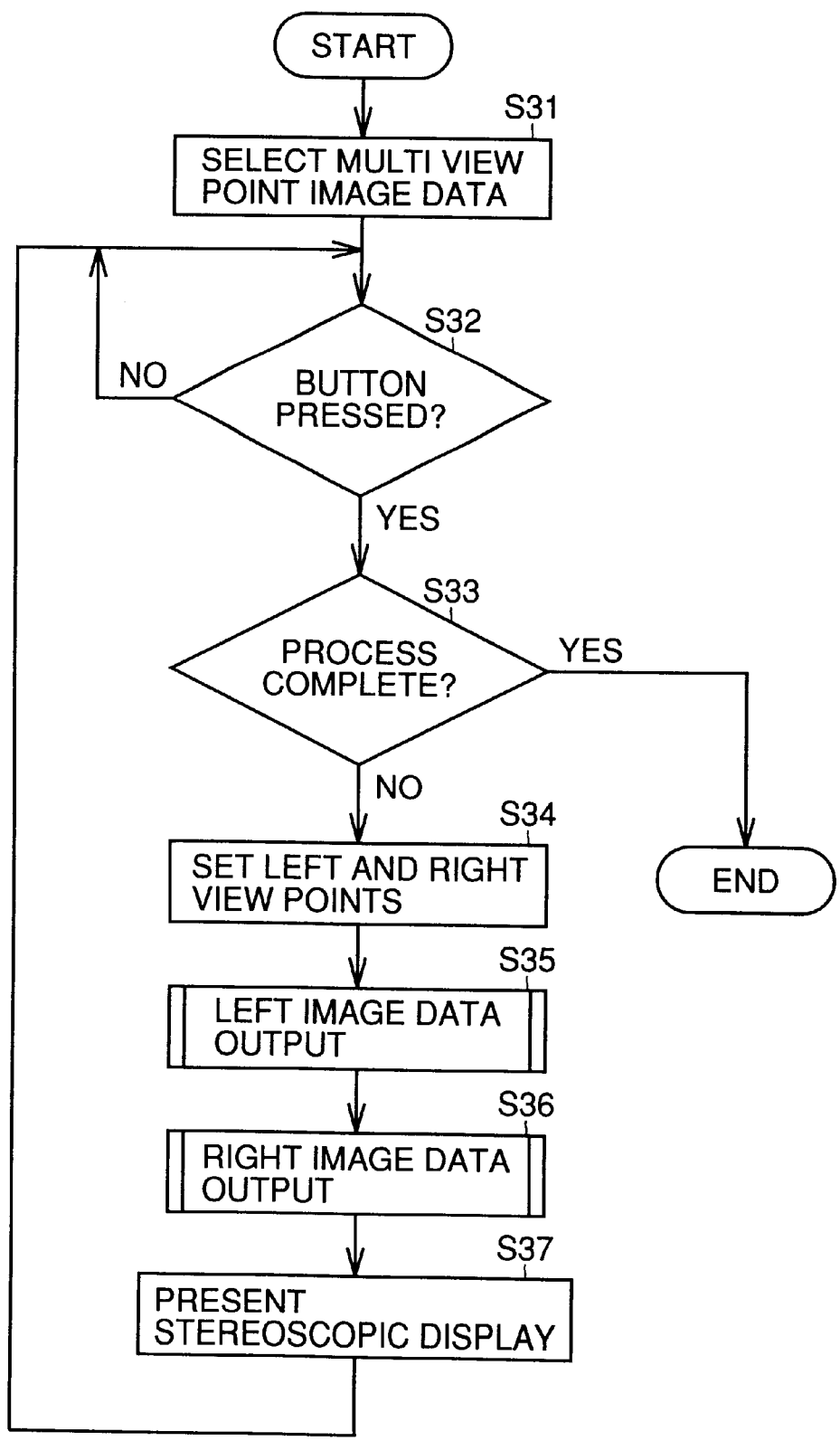
FIG. 17 is a flow chart showing a process performed by the stereoscopic image data display system in accordance with the fourth embodiment.

Referring to FIG. 17, the process executed by stereoscopic image data display system 162 will be described. Under input unit 164, a desired one is selected from multi view point image data 192 stored in memory 118 (S31). The desired one is selected by the user pressing any of the buttons, for example, while browsing the multi view point view image data 192 successively displayed as planar image on the planer display screen, not shown.

Thereafter, whether any of the buttons is pressed or not is determined (S32). If not (NO in S32), the flow waits for the pressing of a button (S32). When a button is pressed (YES in S32), whether the process should be terminated or not is determined (S33). If end button 172 is pressed, the process is terminated (YES in S33), and otherwise, the process is continued (NO in S33).

If the process is not to be terminated (NO in S33), left and right view points are set for stereoscopic display (S34). The left and right view points are represented by the latitude δ and longitude α of the spherical coordinate system, with the left view point being (δ, αL) and the right view point (δ, αR). Setting of view points is performed by input unit 164. Thereafter, image data viewed from the left view point is formed and output through input/output interface 122 (S35). Further, image data viewed from the right view point is formed and output through input/output interface 122 (S36). Receiving the left and right image data, stereoscopic display screen 126 synthesizes the left and right image data internally, and provides stereoscopic display (S37).

Referring to FIG. 14, the process of S34 will be described. The coordinates of the left and right view points (δ, αL) and (δ, αR) set in the process of S34 last time are updated in accordance with the following six rules. If the step S34 is performed for the first time, default values set in advance and stored in memory 118 are used as the coordinates of the last time. In the following, s1, s2 and s3 represent positive values indicating updating value, and min (A, B) and max (A, B) are defined as functions having the minimum value and the maximum value of A and B as the result values. Here, αL and αR are values going around in the range of [−180°, 180°], and the longitude −180° represents the same longitude as 180°. Accordingly, when αL or αR attains smaller than −180° as a result of updating the coordinate, 360° is added to the value after updating, so that αL or αR is within the range of [−180°, 180°]. Similarly, when αL or αR exceeds 180°, 360° is subtracted from the value after updating, so that αL or αR is within the range of [−180°, 180°]. Similarly, appropriate processing is performed so that the value δ of the latitude is within the range of [−90°, 90°].

(1) When left button 136 is pressed $$\alpha L := \alpha L - s1 \quad (3)$$

$$\alpha R := \alpha R - s1 \quad (4)$$

(2) When right button 138 is pressed $$\alpha L := \alpha L + s1 \quad (5)$$

$$\alpha R := \alpha R + s1 \quad (6)$$

(3) When up button 132 is pressed $$\delta := \min(\delta + s2, 90°) \quad (7)$$

(4) When down button 134 is pressed $$\delta := \max(\kappa - s2, -90°) \quad (8)$$

(5) When widening button 142 is pressed $$\alpha L := \alpha L - s3 \quad (9)$$

$$\alpha R := \alpha R + s3 \quad (10)$$

(6) When narrowing button 140 is pressed $$\alpha L := \alpha L + s3 \quad (11)$$

$$\alpha R := \alpha R - s3 \quad (12)$$

By performing either of the operations (1) to (4), it is possible to move the view point in left, right, upward down direction. By performing either operation (5) or (6), distance between the left and right view points can be adjusted, so that stereoscopic view without any unnaturalness is realized.

Figure 18:
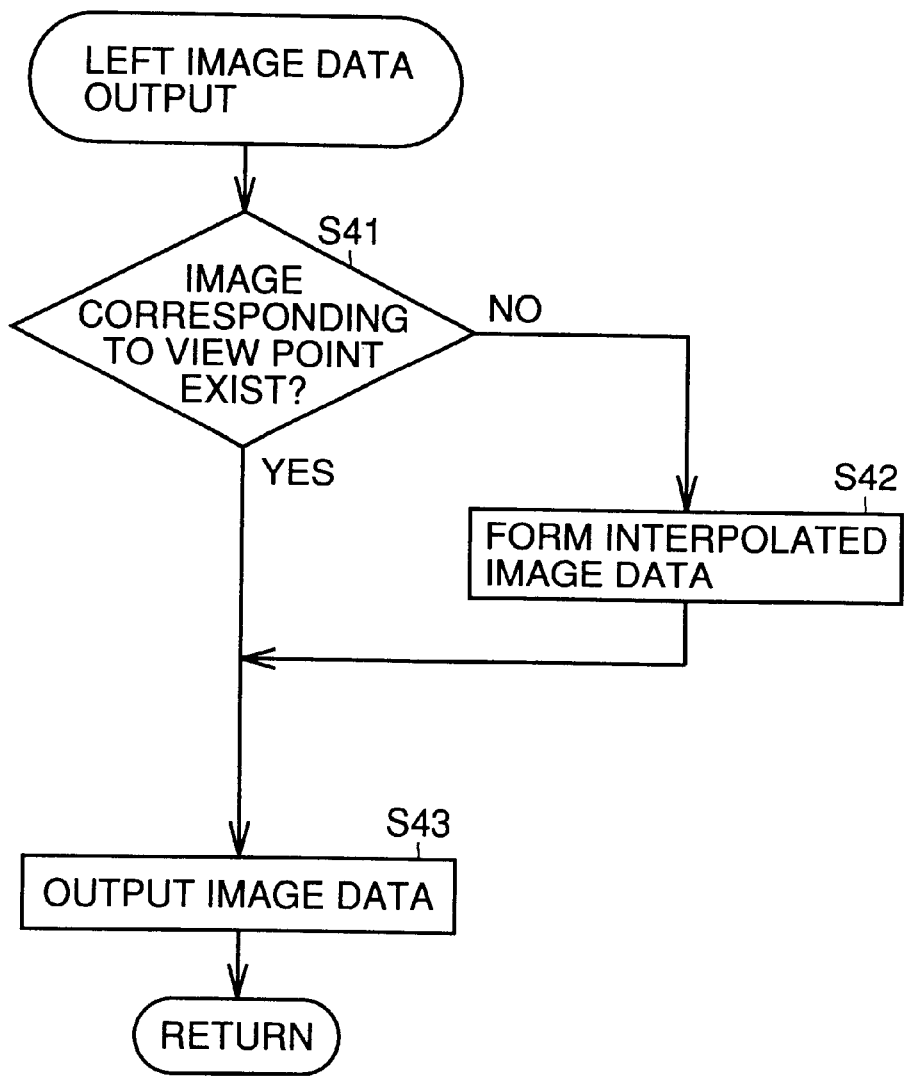
FIG. 18 is a flow chart showing the process of outputting left image data in accordance with the fourth embodiment.

Referring to FIG. 18, the process of S35 will be described in detail. Whether there is an image data viewed from the left view point ($\delta$, $\alpha L$) exists among the multi view point image data 192 is determined (S41). More specifically, whether ($\delta$, $\alpha L$) exists on the lattice point of the spherical coordinate system described with reference to FIG. 15 or not is determined.

When there exists the image data (YES in S41), the image data is output through input/output interface 122 (S43).

When there is not the image data (NO in S41), image data (for example, image data 204) viewed from the left view point ($\delta$, $\alpha L$) is formed by interpolation using image data of a prescribed number photographed from view points near the left view point ($\delta$, $\alpha L$) (for example, image data 196 and 198) (S42). The image data thus formed is output through the input/output interface (S43). The interpolation is known and disclosed in detail in Nobuhiro Tsunashima et al: "construction of Intermediate Multi-viewpoint Images from a Set of Stereo Image Pair", 3D Image Conference '95 pp. 174–177 (1995) and Takeo Azuma et al, "disparity Estimation with Edge Information for Synthesizing Intermediate View Images", 3D Image Conference '95 pp. 190–14 194 (1995), for example.

Figure 19:
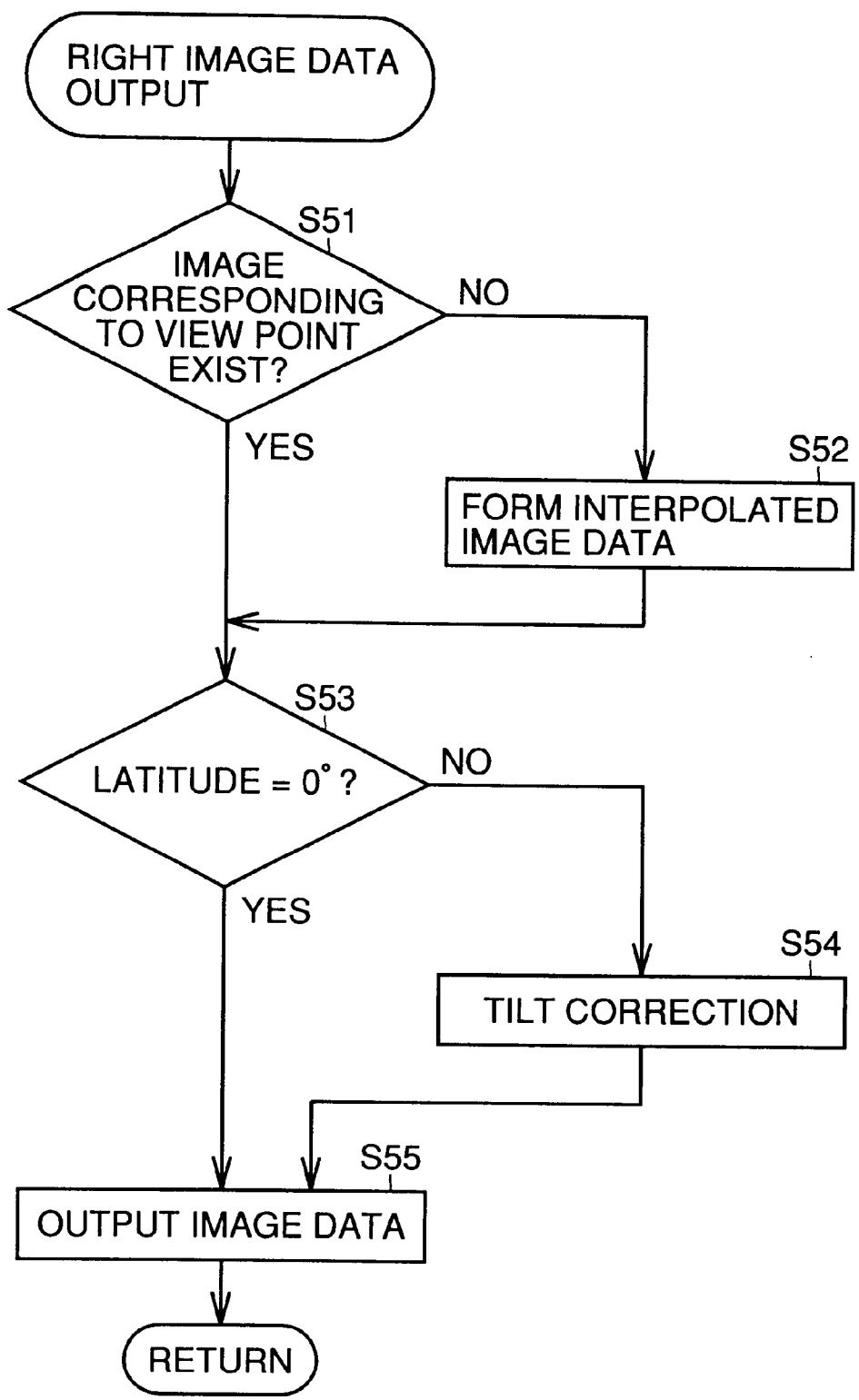
FIG. 19 is a flow chart showing the process of outputting a right image data in accordance with the fourth embodiment.

Referring to FIG. 19, the process of S36 will be described in detail. Whether there is an image data viewed from the right view point ($\delta$, $\alpha R$) among multi view point data 192 is determined (S51). More specifically, whether or not ($\delta$, $\alpha R$) is on a lattice point of the spherical coordinate system described with reference to FIG. 15 is determined.

If there is the image data (YES in S51), the process following the step S53, which will be described later, is performed using the image data. If there is not the image data (NO in S51), interpolation is performed using a prescribed number of image data photographed at view points near the right view point ($\delta$, $\alpha R$), so as to form image data viewed from the right view point ($\delta$, $\alpha R$) (S52), Using thus formed image data, the process following step S53, which will be described later, is performed. The interpolation is the same as that described above.

Thereafter, whether the right view point ($\delta$, $\alpha R$) is on the equator or not, that is, whether $\delta = 0°$ or not is determined (S53). If $\delta = 0°$ (YES in S53), the image data (for example, image data 206) is output through input/output interface 122 (S54).

Figure 20A:
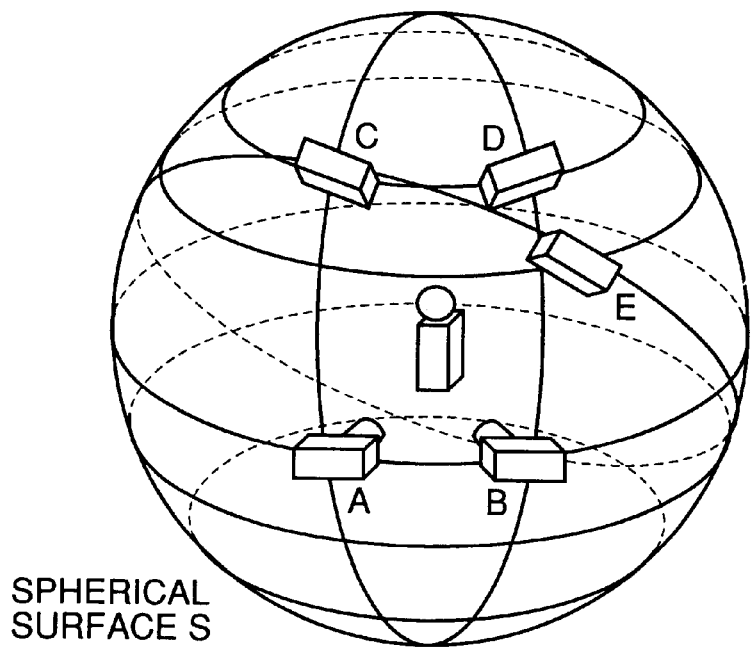
FIGS. 20A and 20B are illustrations related to tilt correction of the right image data in accordance with the fourth embodiment.
Figure 20B:
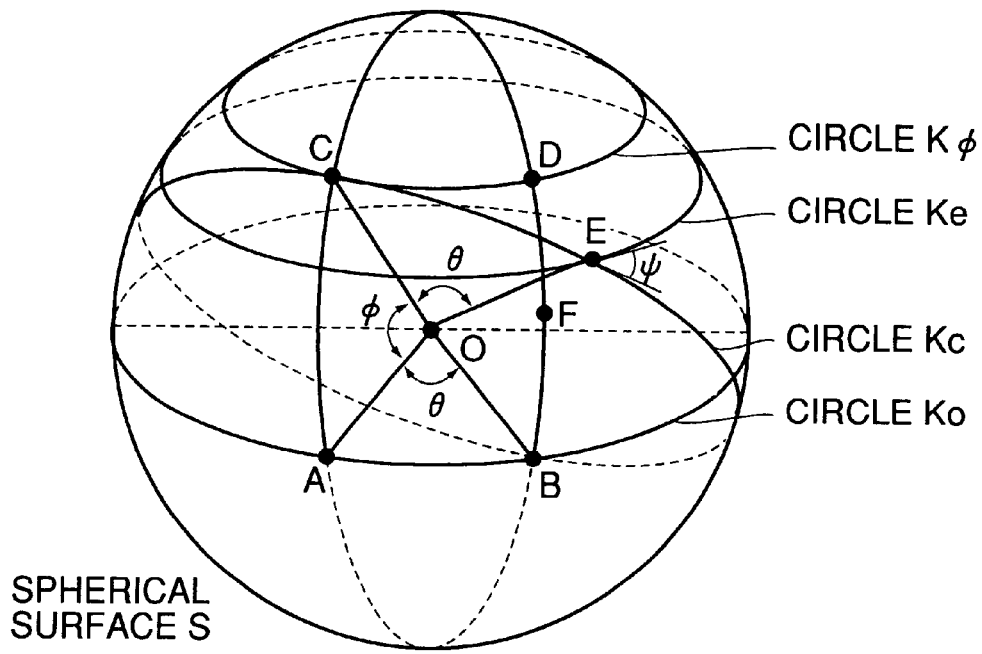

Referring to FIGS. 20A and 20B, the operation when $\delta \neq 0°$ (NO in S53) will be described. As to the arrangement of cameras when $\delta \neq 0°$, bottom surfaces of the cameras are not on one same plane, as represented by points C and D. Stereoscopic view obtained by using two image data photographed under such condition causes a sense of unnaturalness by the viewer. Therefore, one of the points D is moved to the point E where the bottom surface of the camera is placed on the same plane as the bottom surface of the camera at point C. When two image data photographed at points C and E are used, stereoscopic view is realized. A method of forming image data viewed from point E will be described in the following.

(1) A circle on spherical surface S constituted by points having the same latitude as the point C is represented as K$\phi$.

(2) A circle Kc having the same diameter as equator circle Ko on spherical surface S in contact with circle K$\phi$ is found.

(3) On the circle Kc, polar coordinate position of point E forming an angle $\theta$ with the point C is calculated (the angle COE formed with the center O of the spherical coordinate system is COE=$\theta$), where $\theta$ corresponds to the angle AOB when the view points (0, $\alpha L$) and (0, $\alpha R$) are represented as points A and B, respectively.

(4) A circle on the spherical surface S constituted by points having the same latitude as point E is represented as Ke.

(5) An angle $\theta$ formed by a tangent at point E of circle Kc in a plane including circle Kc and a tangent at point E of circle Ke existing in a plane including circle Ke is calculated. A lattice point F which is closest to the polar coordinate of point E is found.

(6) Inclination of image of image data of point F is rotated by the angle $-\theta$, for tilt correction.

Through the process steps (1) to (6) described above, image data viewed from point E is formed. Thereafter, image data taken at points C and E are output through input/output interface 122 (S54).

Figure 21:
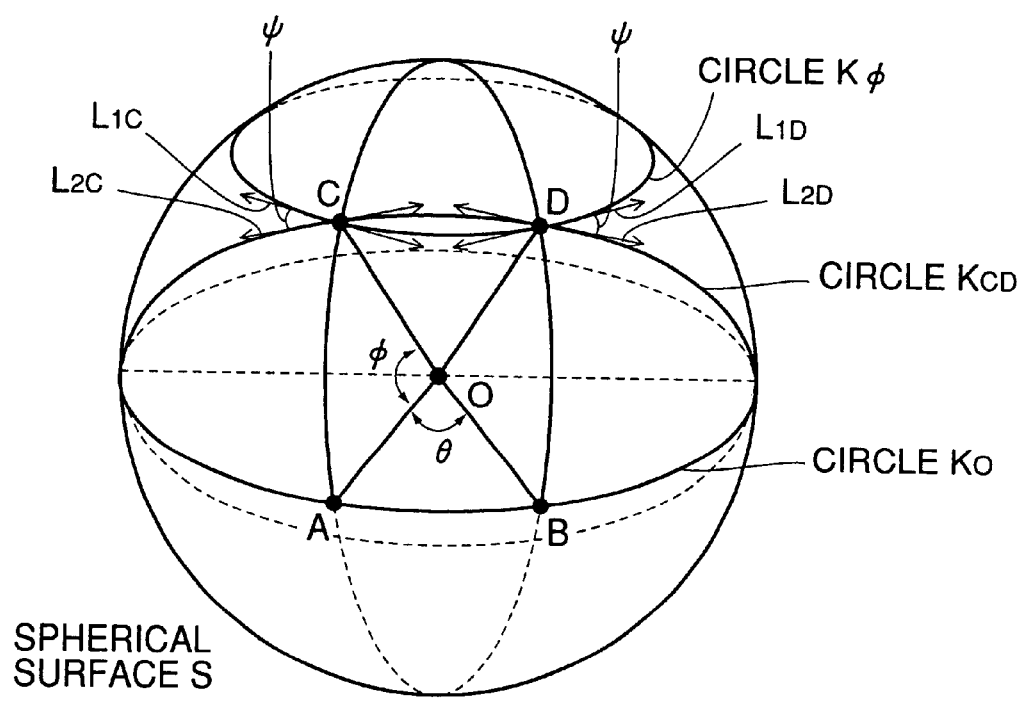
FIG. 21 is an illustration related to tilt correction of the left and right image data in accordance with the fourth embodiment.

In the above described example, the data at point C is determined to be the left image, and only the right image corresponding thereto is subjected to tilt correction. It is possible to eliminate unnaturalness in a simple manner by correcting inclination or tilt of both left and right images, as shown in FIG. 21.

(1) A circle on the spherical surface S constituted by points having the same latitude as points C and D is represented as K$\phi$.

(2) A circle $K_{CD}$ having the same diameter as equator circle Ko on spherical surface S and passing through points C and D is found.

(3) Tangents $L_{1C}$ and $L_{1D}$ at points C and D of circle K$\phi$ existing in the plane including the circle K$\phi$, and tangents $L_{2C}$ and $L_{2D}$ at points C and D of circle $K_{CD}$ existing in the plane including the circle $K_{CD}$ are calculated.

(4) An angle $\theta$ formed by tangents $L_{1C}$ and $L_{2C}$ (angle formed by tangents $L_{1D}$ and $L_{2D}$) is found, the left image taken from point C is rotated by +$\phi$, and the right image taken from point D is rotated by $-\phi$, for tilt correction.

By repeating the process steps S2 to S7 described above successively as needed, it is possible to continuously display stereoscopic image data viewed from various view points, in accordance with user's setting.

Though binocular stereoscopic view has been described in the embodiments above, it is possible to provide a configuration allowing multi view point stereoscopic view having three or more view points. In that case, computer 114 forms image data viewed from the three or more view points in the similar manner as the left and right image data described above. An input unit allowing setting of a plurality of view points is used in place of input unit 164, and a display allowing multi view point stereoscopic display is used in place of binocular stereoscopic display 126.

By the stereoscopic image data display system 162 described above, stereoscopic display is readily provided, utilizing existing multi view point image data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stereoscopic display apparatus for giving a stereoscopic display utilizing multi view point image data constituted by a plurality of image data, comprising:

view point setting means for setting a plurality of view points, and image data forming and outputting means for forming and outputting a plurality of image data viewed from respective ones of said plurality of view points set by said view point setting means, utilizing said multi view point image data, wherein said image data forming and outputting means includes means for outputting, when a plurality of photographing means virtually set at respective ones of said plurality of view points for photographing said plurality of image data satisfy a prescribed relation, image data viewed from said plurality of view points, and means for converting, when said plurality of photographing means do not satisfy said prescribed relation, the image data viewed from said plurality of view points to image data which would be photographed by said plurality of photographing means satisfying said prescribed relation, and outputting the converted image data, and wherein said prescribed relation is a relation where bottom sides of said plurality of photographing means all exist on one same plane.

2. The method of stereoscopic display utilizing multi view point image data constituted by a plurality of image data, comprising the steps of:

setting a plurality of view points, and forming and outputting a plurality of image data viewed from respective ones of said plurality of view points, utilizing said multi view point image data, wherein said step of forming and outputting said plurality of image data include the steps of:

outputting, when a plurality of photographing means virtually set at respective ones of said plurality of view points for photographing said plurality of image data satisfy a prescribed relation, image data viewed from said plurality of view points, and converting, when said plurality of photographing means does not satisfy said prescribed relation, the image data viewed from said plurality of view points to image data which would be taken by said plurality of photographing means satisfying said prescribed relation, and outputting the converted image data, and wherein said prescribed relation is a relation where bottom sides of said plurality of photographing means all exist on same plane.

* * * * *

UNITED STATES PATENT AND TRADEMARK OFFICE
CERTIFICATE OF CORRECTION

PATENT NO.   : 6,747,610 B1
DATED        : June 8, 2004
INVENTOR(S)  : Kenji Taima et al.

It is certified that error appears in the above-identified patent and that said Letters Patent is hereby corrected as shown below:

<u>Title page,</u>
Item [56], References Cited, OTHER PUBLICATIONS, add the following reference:
-- 3 JIGEN KONPHUTA GURAPHIKUSU (3-dimensional computer graphics), Eihachiro Nakamae et al., First Edition, SHOUKOUDO, May 20, 1986, pp. 41-45 --

Signed and Sealed this

Eleventh Day of January, 2005

JON W. DUDAS
*Director of the United States Patent and Trademark Office*